United States Patent
Masutani et al.

(10) Patent No.: US 9,415,722 B2
(45) Date of Patent: Aug. 16, 2016

(54) WORKING VEHICLE PERIMETER MONITORING SYSTEM AND WORKING VEHICLE

(71) Applicant: Komatsu Ltd., Tokyo (JP)

(72) Inventors: Eishin Masutani, Hiratsuka (JP); Masaomi Machida, Hiratsuka (JP); Takeshi Kurihara, Hiratsuka (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 13/824,491

(22) PCT Filed: Oct. 19, 2012

(86) PCT No.: PCT/JP2012/077064
§ 371 (c)(1),
(2) Date: Mar. 18, 2013

(87) PCT Pub. No.: WO2014/045459
PCT Pub. Date: Mar. 27, 2014

(65) Prior Publication Data
US 2016/0016512 A1  Jan. 21, 2016

(30) Foreign Application Priority Data

Sep. 21, 2012 (JP) ................. 2012-208828

(51) Int. Cl.
| | |
|---|---|
| *B60Q 1/00* | (2006.01) |
| *B60Q 9/00* | (2006.01) |
| *G08G 1/16* | (2006.01) |
| *G01S 13/87* | (2006.01) |

(Continued)

(52) U.S. Cl.
CPC . *B60Q 9/008* (2013.01); *B60R 1/00* (2013.01); *G01S 13/87* (2013.01); *G01S 13/931* (2013.01); *G08G 1/166* (2013.01); *B60R 2300/301* (2013.01); *B60R 2300/70* (2013.01); *G01S 2013/9375* (2013.01); *G01S 2013/9378* (2013.01)

(58) Field of Classification Search
CPC ............ G08G 1/166; B60R 2300/105; B60R 2300/10; B60R 2300/00; B60R 1/00; G01S 13/931; G01S 2013/9375–2013/9396; G01S 13/87; B60Q 9/008
USPC .......................... 340/435, 436, 903; 701/301
See application file for complete search history.

(56) References Cited

U.S. PATENT DOCUMENTS

| | | | |
|---|---|---|---|
| 6,268,803 B1 * | 7/2001 | Gunderson | B60Q 9/006 340/436 |
| 2009/0259399 A1 | 10/2009 | Kotejoshyer et al. | |

FOREIGN PATENT DOCUMENTS

| | | |
|---|---|---|
| JP | 2002-157700 A | 5/2002 |
| JP | 2004-038245 A | 2/2004 |

(Continued)

OTHER PUBLICATIONS

International Search Report dated Dec. 18, 2012, issued for PCT/JP2012/077064 (in Jpanese lanaguage).

*Primary Examiner* — Thomas Mullen
(74) *Attorney, Agent, or Firm* — Locke Lord LLP

(57) ABSTRACT

A working vehicle perimeter monitoring system includes: a plurality of object detecting devices which are attached to a working vehicle and detect an object existing in a periphery of the working vehicle; and a controller which enables or disables of a generation of an alarm notifying an existence of the object based on a detection value of the object detecting device and a predetermined threshold value and sets the predetermined threshold value to be different inside and outside a predetermined region set in the periphery of the working vehicle based on an operation range of the working vehicle.

6 Claims, 15 Drawing Sheets

(51) Int. Cl.
   *G01S 13/93*   (2006.01)
   *B60R 1/00*   (2006.01)

(56) References Cited

FOREIGN PATENT DOCUMENTS

| JP | 2005-082124 A | 3/2005 |
| JP | 2005-324746 A | 11/2005 |
| JP | 2008-102591 A | 5/2008 |
| JP | 2008-114673 A | 5/2008 |
| JP | 2008-163719 A | 7/2008 |
| JP | 2009-181315 A | 8/2009 |
| JP | 2009-237898 A | 10/2009 |
| JP | 2010-198519 A | 9/2010 |
| WO | WO-2009/129284 A2 | 10/2009 |
| WO | WO-2011/158955 A1 | 12/2011 |

* cited by examiner

WORKING VEHICLE PERIMETER MONITORING SYSTEM AND WORKING VEHICLE

FIELD

The present invention relates to a technology of monitoring a perimeter of a working vehicle.

BACKGROUND

In a civil engineering work site or a quarry site of a mine, various working vehicles such as a dump truck and an excavator are operated. Particularly, a superjumbo working vehicle is used in a mine. Since such a working vehicle has a vehicle width, a vehicle height, and a longitudinal length noticeably larger than those of a general vehicle, it is difficult for an operator to check and recognize a peripheral circumstance by a side mirror and the like.

There is known a collision preventing system which shows a peripheral circumstance of a machine to an operator and prevents a collision between the machine and an obstacle. As the collision preventing system, the machine includes radar devices as a plurality of obstacle sensors (for example, Patent Literature 1).

CITATION LIST

Patent Literature

Patent Literature 1: US 2009/0,259,399

SUMMARY

Technical Problem

When notifying the existence of the subject (object) in the periphery of the working vehicle to the operator (a service man when checking or repairing the working vehicle) of the working vehicle, there is a need to reliably notify all subjects existing in the periphery of the working vehicle by an alarm or the like.

In the working vehicle such as the dump truck, there is a need to provide a system capable of checking a peripheral circumstance when switching from a stop state to a running state, that is, a perimeter monitoring system capable of reliably monitoring the perimeter. If it is possible to detect the object existing in the range supposed as the operation range of the working vehicle so that the operator may recognize the existence of the object when the working vehicle switches from the stop state to the running state, it is possible to further reliably monitor the perimeter.

It is an object of the invention to reliably detect the object existing in the periphery of the working vehicle and existing in the region supposed as the operation range of the working vehicle and to cause the operator to easily recognize the object that needs the attention of the operator in the objects existing in the periphery of the working vehicle.

Solution to Problem

According to the present invention, a working vehicle perimeter monitoring system comprises: a plurality of object detecting devices which are attached to a working vehicle and detect an object existing in a periphery of the working vehicle; and a controller which enables or disables of a generation of an alarm notifying an existence of the object based on a detection value of the object detecting device and a predetermined threshold value and sets the predetermined threshold value to be different inside and outside a predetermined region set in the periphery of the working vehicle based on an operation range of the working vehicle.

In the present invention, it is preferable that the predetermined region is set based on at least a trace of a front corner portion of the working vehicle when the working vehicle turns at a minimum turning radius.

In the present invention, it is preferable that the controller generates the alarm when at least the detection value is equal to or larger than the predetermined threshold value, and the predetermined threshold value inside the predetermined region is smaller than the predetermined threshold value outside the predetermined region.

In the present invention, it is preferable that the predetermined region has a rectangular shape in a plan view.

In the present invention, it is preferable that the predetermined region has a rectangular shape in the plan view in at least one of a front side and a lateral side of the working vehicle or in both sides thereof.

According to the present invention, a working vehicle perimeter monitoring system comprises: a plurality of object detecting devices which are attached to a working vehicle and detect an object existing in a periphery of the working vehicle by a radar; and a controller which generates an alarm at least when a detection value of the object detecting device is equal to or larger than a predetermined threshold value, wherein a predetermined region is set in a periphery of the working vehicle based on at least a minimum turning radius of the working vehicle and a trace of a front corner portion of the working vehicle and the predetermined threshold value inside the predetermined region is smaller than the predetermined threshold value outside the predetermined region.

According to the present invention, a working vehicle comprises: the working vehicle perimeter monitoring system.

According to the invention, it is possible to reliably detect the object existing in the periphery of the working vehicle and existing in the region supposed as the operation range of the working vehicle and to cause the operator to easily recognize the object that needs the attention of the operator in the objects existing in the periphery of the working vehicle.

DESCRIPTION OF EMBODIMENTS

Figure 1:
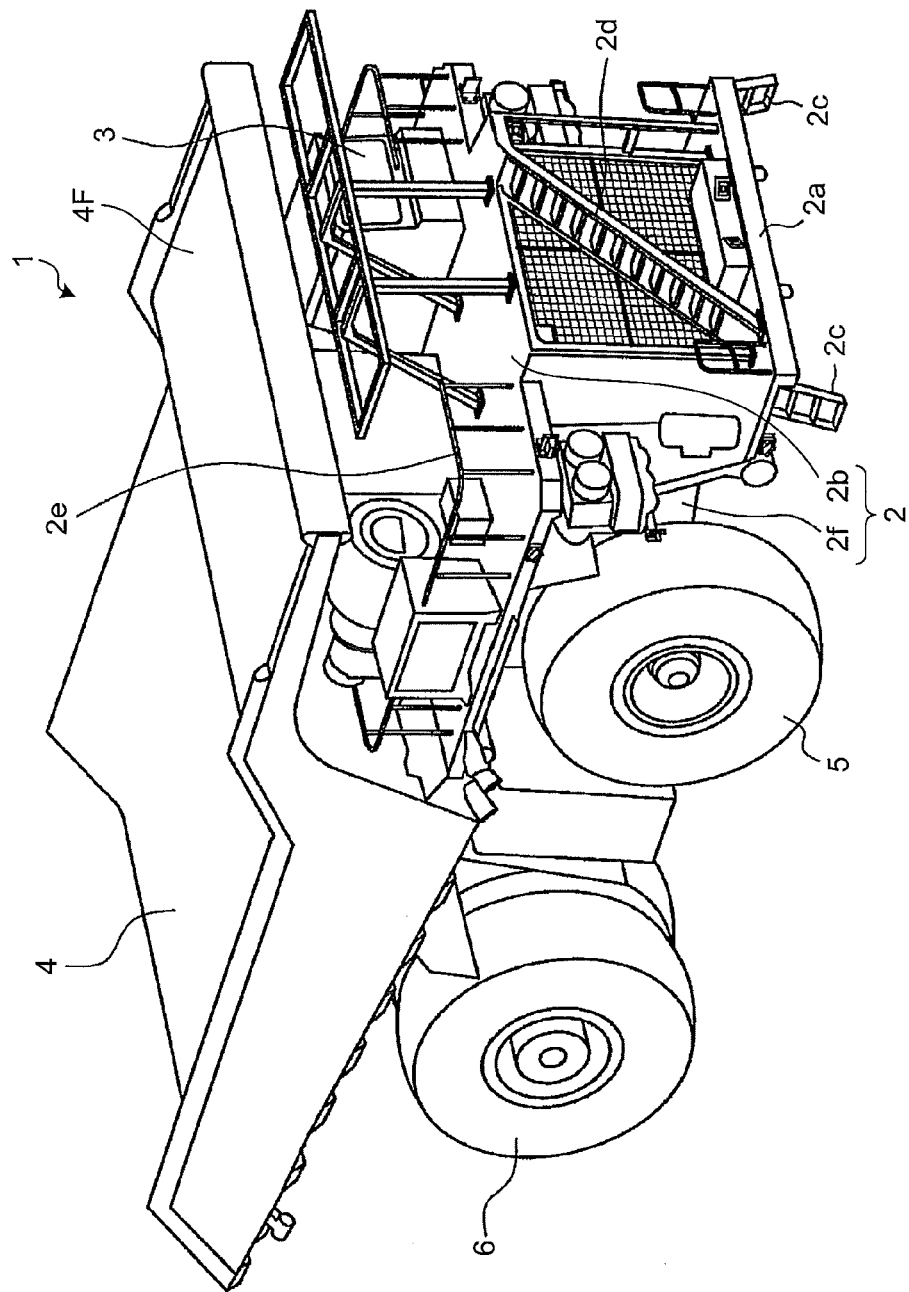
FIG. 1 is a perspective view illustrating a working vehicle according to an embodiment.

A mode for carrying out the invention (embodiment) will be described in detail by referring to the drawings. In the description below, the front side, the rear side, the left side, and the right side are terms based on an operator who sits on a driver seat. For example, the front side indicates the side where the visual line of the operator (a service man instead of an operator when checking or repairing a working vehicle) as the manipulator sitting on the driver seat is directed and the side directed from the driver seat toward a handle operated by the operator. The rear side indicates the opposite side to the front side and the side directed from the handle toward the driver seat. The vehicle width direction of the working vehicle is identical to the left and right direction of the working vehicle.

Working Vehicle

Figure 2:
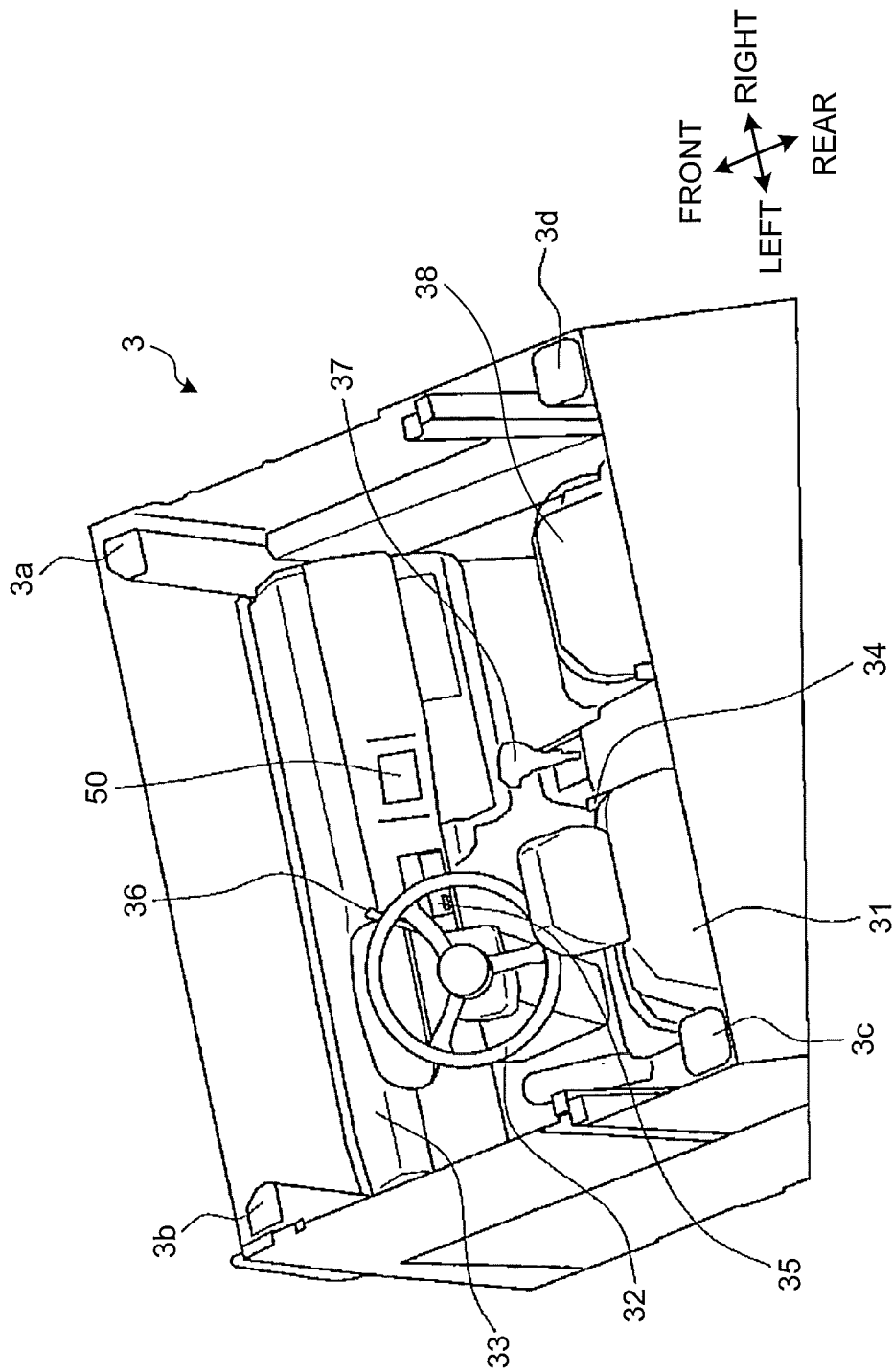
FIG. 2 is a diagram illustrating a structure and an interior of a cab 3 which is included in the working vehicle according to the embodiment.

FIG. 1 is a perspective view illustrating a working vehicle according to the embodiment. FIG. 2 is a diagram illustrating a structure and an interior of a cab 3 which is included in the working vehicle according to the embodiment. In the embodiment, a self-propelled dump truck (called an off-highway truck) 1 as the working vehicle is a superjumbo vehicle which is used for an operation in a mine. In the embodiment, the working vehicle may not include an upper turning body and a working machine. Further, the type of the dump truck as the working vehicle is not limited.

A dump truck 1 may be of, for example, an articulated type or the like. The dump truck 1 includes a vehicle body portion 2, the cab 3, a vessel 4, a pair of left and right front wheels 5, and a pair of left and right rear wheels 6 of which each pair includes two wheels. The vehicle body portion 2 includes an upper deck 2b and a frame 2f disposed along the front and rear direction. Further, the dump truck 1 includes a perimeter monitoring system which monitors the perimeter thereof and displays the result. The perimeter monitoring system will be described in detail later.

In the embodiment, the dump truck 1 drives an electric motor by the power generated when an internal combustion engine such as a diesel engine drives a generator, so that the rear wheels 6 are driven. In this way, the dump truck 1 is of a so-called electric driving type, but the driving type of the dump truck 1 is not limited thereto. For example, the dump truck 1 may transmit the power of the internal combustion engine to the rear wheels 6 through a transmission so as to drive the rear wheels or may drive an electric motor by the power supplied through a trolley from a line so as to drive the rear wheels 6 by the electric motor.

The frame 2f supports power generating mechanisms such as the internal combustion engine and the generator and auxiliary machines thereof. The left and right front wheels 5 (only the right front wheel is illustrated in FIG. 1) are supported by the front portion of the frame 2f. The left and right rear wheels 6 (only the right rear wheel is illustrated in FIG. 1) are supported by the rear portion of the frame 2f. Each of the front wheels 5 and the rear wheels 6 has a diameter of about 2 m (meter) to 4 m (meter). As for the rear wheels 6, the inside position of the vessel 4 in the width direction or the outside of the vessel 4 in the width direction is substantially disposed at the same position as the outside of the rear wheel 6 in the width direction. The frame 2f includes a lower deck 2a and the upper deck 2b. The lower deck 2a is provided near a ground surface and the upper deck 2b is provided above the lower deck 2a. In this way, the dump truck 1 which is used in a mine is formed as a double deck structure with the lower deck 2a and the upper deck 2b.

The lower deck 2a is attached to the lower portion of the front surface of the frame 2f. The upper deck 2b is disposed above the lower deck 2a. A movable ladder 2c which is used to elevate, for example, the cab 3 is disposed below the lower deck 2a. An inclined ladder 2d is disposed between the lower deck 2a and the upper deck 2b so that the operator moves therebetween. Further, a radiator is disposed between the lower deck 2a and the upper deck 2b. A palisade guardrail 2e is disposed on the upper deck 2b. In the embodiment, the ladder 2c and the inclined ladder 2d are set as a part of the upper deck 2b and the lower deck 2a.

As illustrated in FIG. 1, the cab (operating room) 3 is disposed on the upper deck 2b. The cab 3 is disposed on the upper deck 2b so as to be shifted to one side in the vehicle width direction in relation to the center in the vehicle width direction. Specifically, the cab 3 is disposed on the upper deck 2b so as to be positioned at the left side in the vehicle width direction in relation to the center. The arrangement of the cab 3 is not limited to the left side in relation to the center in the vehicle width direction. For example, the cab 3 may be disposed at the right side in the vehicle width direction in relation to the center, and may be disposed at the center in the vehicle width direction. Operation members such as a driver seat, a handle, a shift lever, an accelerator pedal, and a brake pedal are arranged inside the cab 3.

As illustrated in FIG. 2, the cab 3 includes a ROPS (Roll-Over Protection System) with a plurality of (in the embodiment, four) pillars 3a, 3b, 3c, and 3d. The ROPS protects the operator inside the cab 3 if the dump truck 1 rolls over. The driver of the dump truck 1 drives the dump truck in a state where a road shoulder at the left side of the vehicle body portion 2 may be easily checked, but the operator's head needs to be largely moved so as to check the perimeter of the vehicle body portion 2. Further, the upper deck 2b is provided with a plurality of side mirrors (not illustrated) which check the perimeter of the dump truck 1. Since the side mirrors are arranged at positions away from the cab 3, the driver needs to largely move his/her head even when checking the perimeter of the vehicle body portion 2 using the side mirrors.

As illustrated in FIG. 2, a driver seat 31, a handle 32, a dash cover 33, a wireless device 34, a radio receiver 35, a retarder 36, a shift lever 37, a trainer seat 38, a controller (to be described later in detail) as a monitoring control device not illustrated in FIG. 2, a monitor 50, an accelerator pedal, and a brake pedal are provided inside the cab 3. The monitor 50 which is assembled in the dash cover 33 is illustrated in FIG.

2. However, the invention is not limited thereto, and for example, the monitor 50 may be provided on the dash cover 33 or may be provided so as to be suspended from the ceiling inside the cab 3. That is, the monitor 50 may be provided at a position where the operator may see the monitor 50. Furthermore, the controller not illustrated in FIG. 2 is a part of a perimeter monitoring system 10 to be described later. The shift lever 37 is a device which causes the operator of the dump truck 1 to change the advancing direction of the dump truck 1 or the speed gear thereof.

The vessel 4 illustrated in FIG. 1 is a container which loads freight such as crushed stones thereon. The rear portion of the bottom surface of the vessel 4 is rotatably connected to the rear portion of the frame 2f through a rotary pin. The vessel 4 may take a loading posture and a standing posture by an actuator such as a hydraulic cylinder. As illustrated in FIG. 1, the loading posture indicates a posture in which the front portion of the vessel 4 is positioned at the upper portion of the cab 3. The standing posture indicates a posture in which the freight is discharged and the vessel 4 is inclined rearward and downward. When the front portion of the vessel 4 rotates upward, the vessel 4 changes from the loading posture to the standing posture. The vessel 4 includes a flange portion 4F formed at the front portion thereof. The flange portion 4F is called a protector and extends to the upper side of the cab 3 so as to cover the cab 3. The flange portion 4F which extends to the upper side of the cab 3 protects the cab 3 from the collision with crushed stones and the like.

Perimeter Monitoring System

Figure 3:
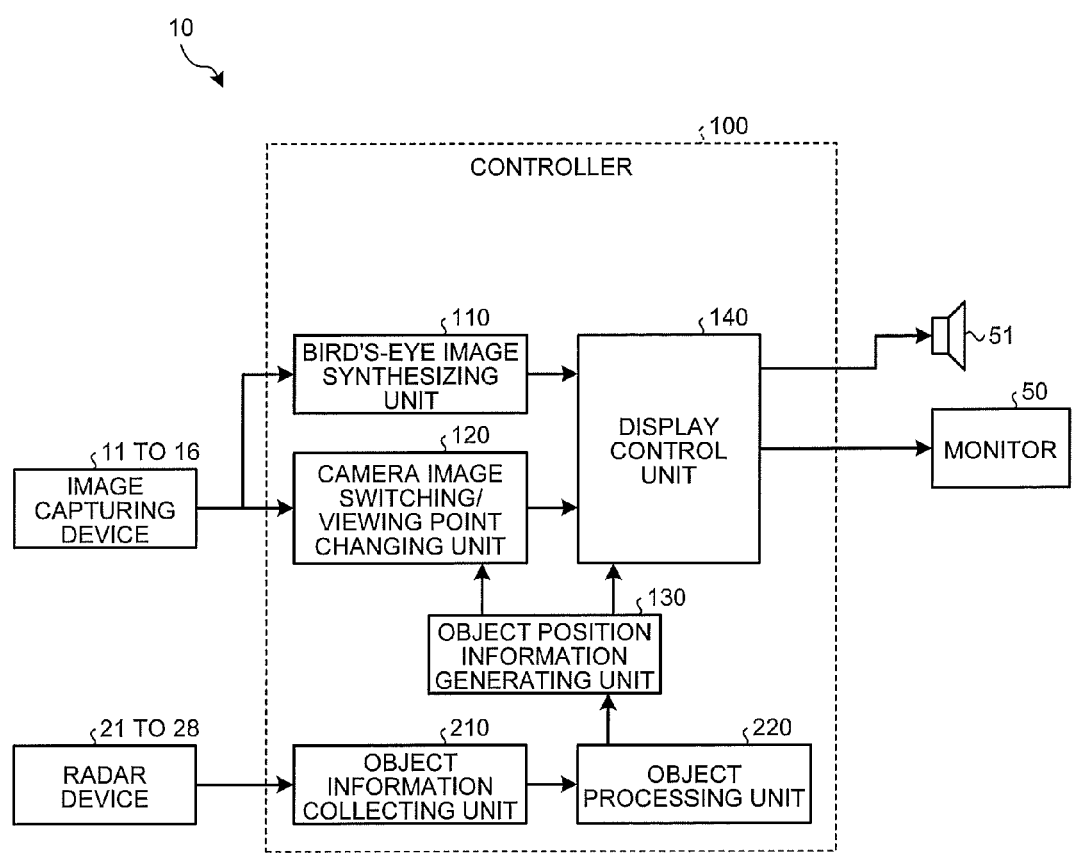
FIG. 3 is a diagram illustrating a perimeter monitoring system 10 according to the embodiment.
Figure 4:
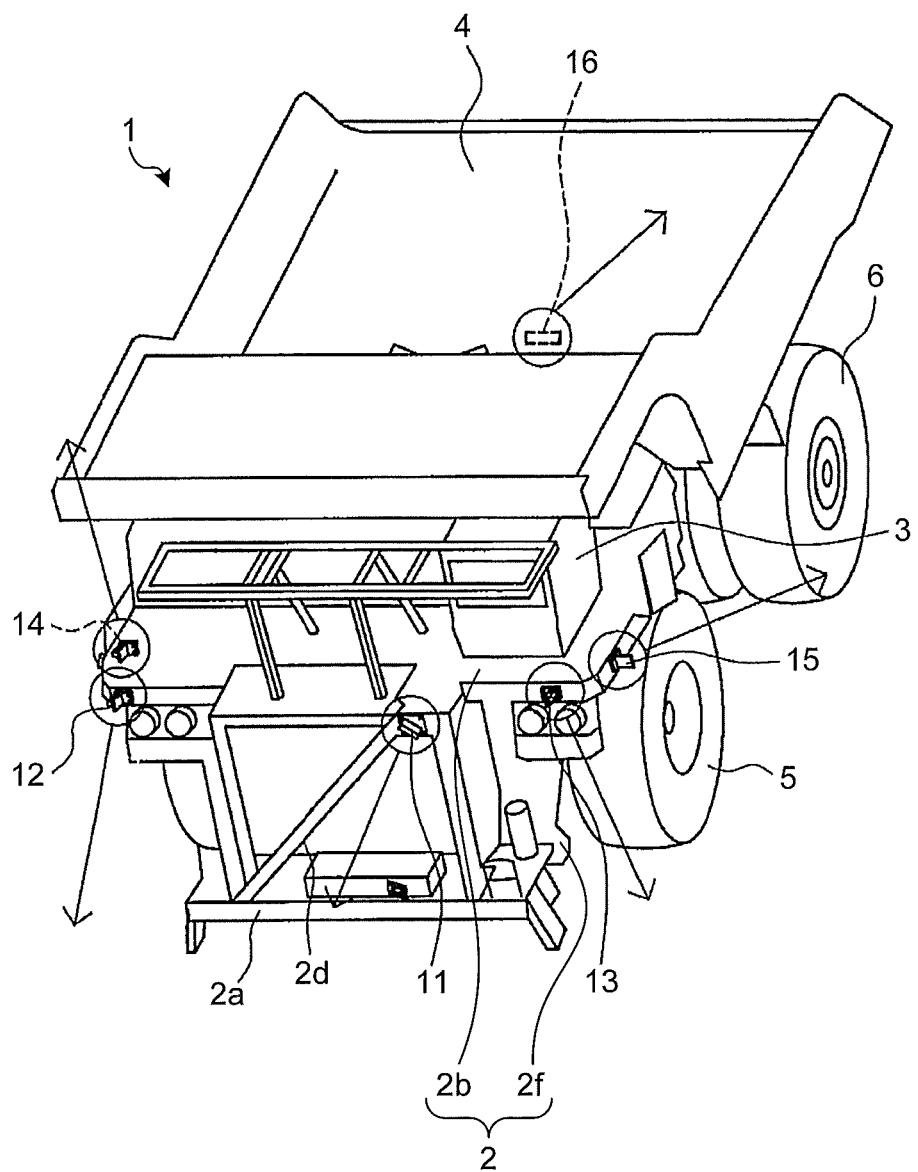
FIG. 4 is a perspective view of a dump truck 1 equipped with image capturing devices 11 to 16 which are included in the perimeter monitoring system 10 according to the embodiment.
Figure 5:
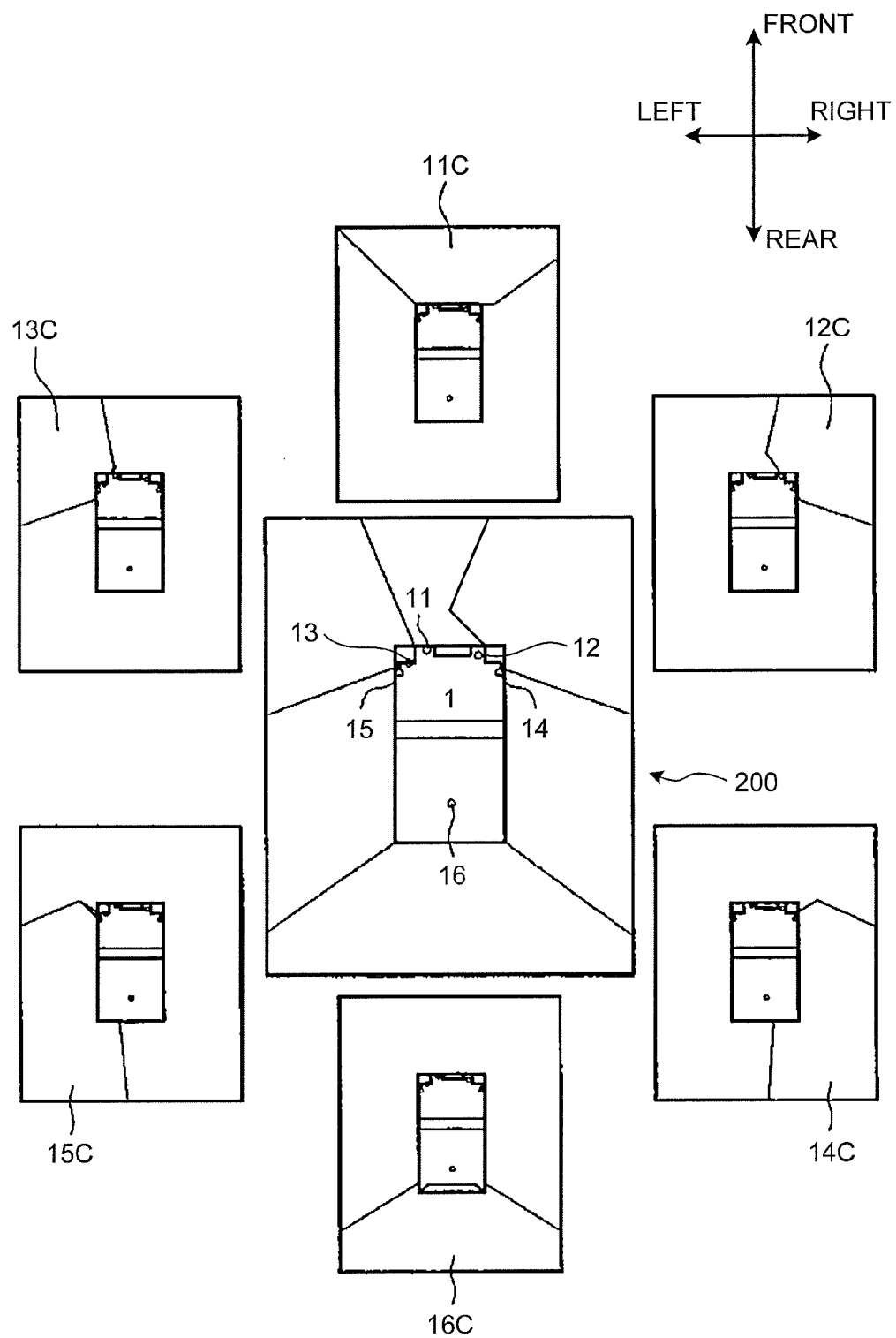
FIG. 5 is a schematic diagram illustrating regions which are captured by a plurality of image capturing devices 11 to 16 and a bird's-eye image 200 which is generated based on the information of images captured by the plurality of image capturing devices 11 to 16.

FIG. 3 is a diagram illustrating the perimeter monitoring system 10 according to the embodiment. FIG. 4 is a perspective view of the dump truck 1 equipped with image capturing devices 11 to 16 which are included in the perimeter monitoring system 10 according to the embodiment. FIG. 5 is a schematic diagram illustrating regions which are captured by a plurality of image capturing devices 11 to 16 and a bird's-eye image 200 which is generated based on the information of the images captured by the plurality of image capturing devices 11 to 16. The regions which are captured by the plurality of image capturing devices illustrated in FIG. 5 are regions based on the ground surface. As illustrated in FIG. 3, the perimeter monitoring system 10 includes a plurality of (in the embodiment, six) image capturing devices 11, 12, 13, 14, 15, and 16, a plurality of (in the embodiment, eight) radar devices 21, 22, 23, 24, 25, 26, 27, and 28, the monitor 50, and a controller 100 as a monitoring control device. Furthermore, in the embodiment, the perimeter monitoring system 10 may not be essentially provided with the image capturing devices 11, 12, 13, 14, 15, and 16.

Image Capturing Device

The image capturing devices 11, 12, 13, 14, 15, and 16 are attached to the dump truck 1. The image capturing devices 11, 12, 13, 14, 15, and 16 are, for example, a wide dynamic range (WDR) camera. The wide dynamic range camera is a camera that has a function of brightly correcting a dark portion to a level in which a bright portion is visible and adjusting the entire portion so as to be visible.

The image capturing devices 11, 12, 13, 14, 15, and 16 capture the perimeter of the dump truck 1 and output the result as image information. In the description below, the image capturing device 11 is appropriately referred to as the first image capturing device 11, the image capturing device 12 is appropriately referred to as the second image capturing device 12, the image capturing device 13 is appropriately referred to as the third image capturing device 13, the image capturing device 14 is appropriately referred to as the fourth image capturing device 14, the image capturing device 15 is appropriately referred to as the fifth image capturing device 15, and the image capturing device 16 is appropriately referred to as the sixth image capturing device 16. Further, when there is no need to distinguish these image capturing devices, these image capturing devices are appropriately referred to as the image capturing devices 11 to 16.

As illustrated in FIG. 4, six image capturing devices 11 to 16 are respectively attached to the outer peripheral portion of the dump truck 1 so as to capture the images in the periphery of the dump truck 1 by 360°. In the embodiment, each of the image capturing devices 11 to 16 has a viewing range of 120° (±60° at each of the left and right sides) in the left and right direction and 96° in the height direction, but the viewing range is not limited thereto. Further, the respective image capturing devices 11 to 16 are indicated by the arrows in FIG. 4, but the directions indicated by the arrows indicate the directions in which the respective image capturing devices 11 to 16 face.

As illustrated in FIG. 4, the first image capturing device 11 is attached to the front surface of the dump truck 1. Specifically, the first image capturing device 11 is disposed at the upper end of the inclined ladder 2d, and more specifically, the lower side of the landing portion of the uppermost stage. The first image capturing device 11 is fixed through the bracket which is attached to the upper deck 2b so as to face the front side of the dump truck 1. As illustrated in FIG. 5, the first image capturing device 11 captures a first region 11C in the region existing in the periphery of the dump truck 1 and outputs first image information as image information. The first region 11C is a region which is broadened toward the front side of the vehicle body portion 2 of the dump truck 1.

As illustrated in FIG. 4, the second image capturing device 12 is attached to one side portion of the front surface of the dump truck 1. Specifically, the second image capturing device 12 is disposed at the right portion of the front surface of the upper deck 2b. The second image capturing device 12 is fixed through the bracket attached to the upper deck 2b so as to face the diagonally forward right side of the dump truck 1. As illustrated in FIG. 5, the second image capturing device 12 captures a second region 12C in the region existing in the periphery of the dump truck 1 and outputs second image information as image information. The second region 12C is a region which is broadened toward the diagonally forward right side of the vehicle body portion 2 of the dump truck 1.

As illustrated in FIG. 4, the third image capturing device 13 is attached to the other side of the front surface of the dump truck 1. Specifically, the third image capturing device 13 is disposed at the left portion of the front surface of the upper deck 2b. Then, the third image capturing device 13 is disposed so as to be bilaterally symmetric to the second image capturing device 12 about the axis passing the center of the dump truck 1 in the vehicle width direction. The third image capturing device 13 is fixed through the bracket attached to the upper deck 2b so as to face the diagonally forward left side of the dump truck 1. As illustrated in FIG. 5, the third image capturing device 13 captures a third region 13C in the region existing in the periphery of the dump truck 1 and outputs third image information as image information. The third region 13C is a region which is broadened toward the diagonally forward left side of the vehicle body portion 2 of the dump truck 1.

As illustrated in FIG. 4, the fourth image capturing device 14 is attached to one side surface of the dump truck 1. Specifically, the fourth image capturing device 14 is disposed at the front portion of the right side surface of the upper deck 2b. The fourth image capturing device 14 is fixed through the bracket attached to the upper deck 2b so as to face the diagonally backward right side of the dump truck 1. As illustrated in FIG. 5, the fourth image capturing device 14 captures a fourth region 14C in the region existing in the periphery of the dump truck 1 and outputs fourth image information as image information. The fourth region 14C is a region which is broadened toward the diagonally backward right side of the vehicle body portion 2 of the dump truck 1.

As illustrated in FIG. 4, the fifth image capturing device 15 is attached to the other side surface of the dump truck 1. Specifically, the fifth image capturing device 15 is disposed at the front portion of the left side surface of the upper deck 2b. Then, the fifth image capturing device 15 is disposed so as to be bilaterally symmetric to the fourth image capturing device 14 about the axis passing the center of the dump truck 1 in the vehicle width direction. As illustrated in FIG. 5, the fifth image capturing device 15 captures a fifth region 15C in the region existing in the periphery of the dump truck 1 and outputs fifth image information as image information. The fifth region 15C is a region which is broadened toward the diagonally backward left side of the vehicle body portion 2 of the dump truck 1.

As illustrated in FIG. 4, the sixth image capturing device 16 is attached to the rear portion of the dump truck 1. Specifically, the sixth image capturing device 16 is disposed above an axle housing connecting two rear wheels 6 and 6 at the rear end of the frame 2f and near the rotary shaft of the vessel 4. The sixth image capturing device 16 is fixed toward the rear side of the dump truck 1 through the bracket which is attached to a crossbar connecting the left and right frames 2f. As illustrated in FIG. 5, the sixth image capturing device 16 captures a sixth region 16C in the region existing in the periphery of the dump truck 1 and outputs sixth image information as image information. The sixth region 16C is a region which is broadened toward the rear side of the vehicle body portion 2 of the dump truck 1.

By using the above-described six image capturing devices 11 to 16, the perimeter monitoring system 10 according to the embodiment may capture the images in the entire circumference of the dump truck 1 by 360° and acquire the image information as illustrated in the center of FIG. 5. Six image capturing devices 11 to 16 transmit the first image information to the sixth image information as the respectively captured image information items to the controller 100 illustrated in FIG. 3.

The first image capturing device 11, the second image capturing device 12, the third image capturing device 13, the fourth image capturing device 14, and the fifth image capturing device 15 are provided in the upper deck 2b which exists at the relatively high position. For this reason, the controller 100 may obtain an image which is seen from the overhead position toward the ground surface by the first image capturing device 11 to the fifth image capturing device 15 and hence may capture a subject (hereinafter, referred to as an appropriate object) such as a vehicle existing on the ground surface in a broad range. Further, even when the viewing point is changed upon causing the controller 100 to generate the bird's-eye image 200 illustrated in FIG. 5 from the first image information to the sixth image information acquired by the first image capturing device 11 to the sixth image capturing device 16, the deformation degree of the three-dimensional object is suppressed since the first image information to the fifth image information in the first image information to the sixth image information are information items captured from the overhead position.

Radar Device

Figure 6:
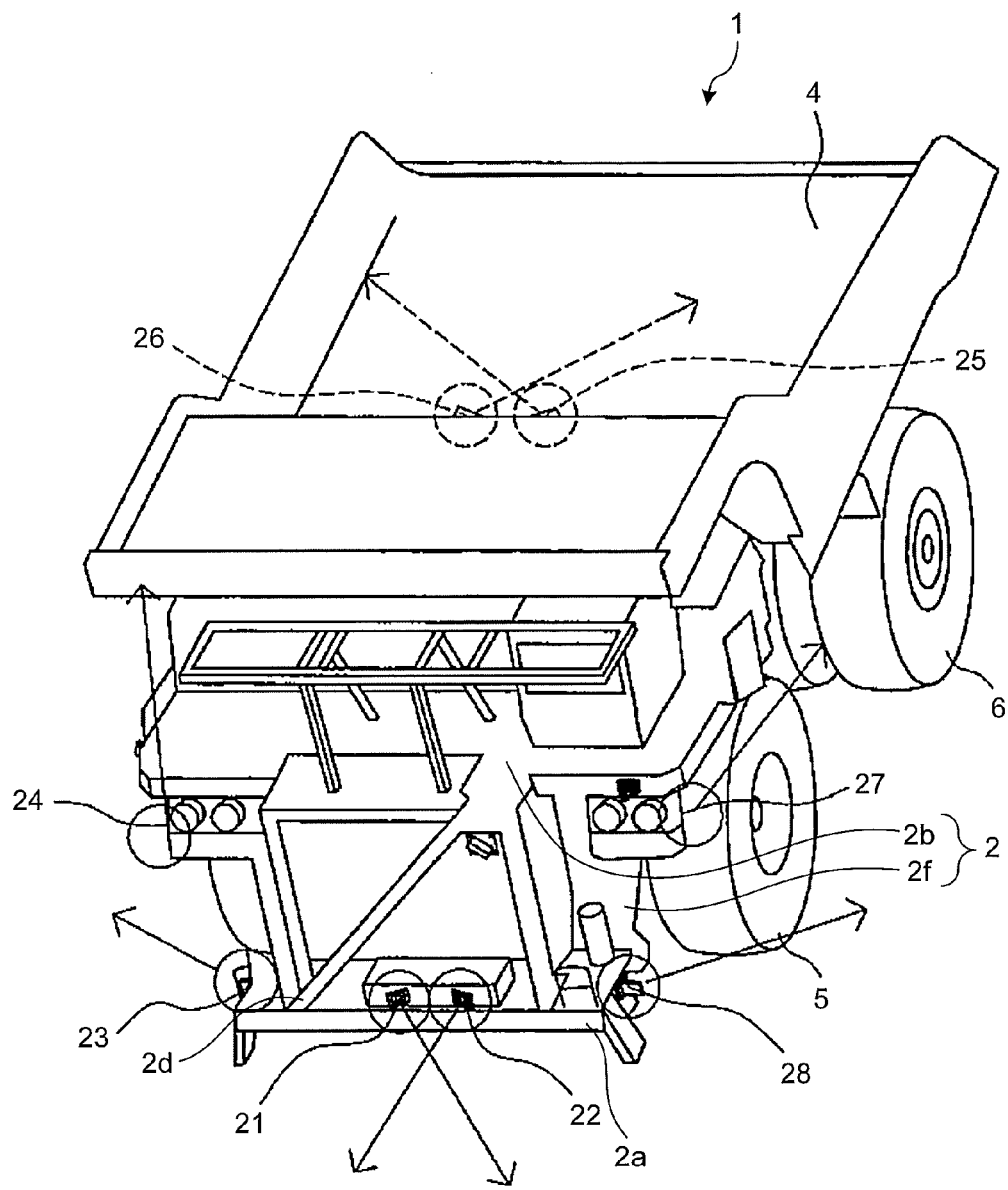
FIG. 6 is a perspective view illustrating an arrangement of radar devices 21 to 28.
Figure 7:
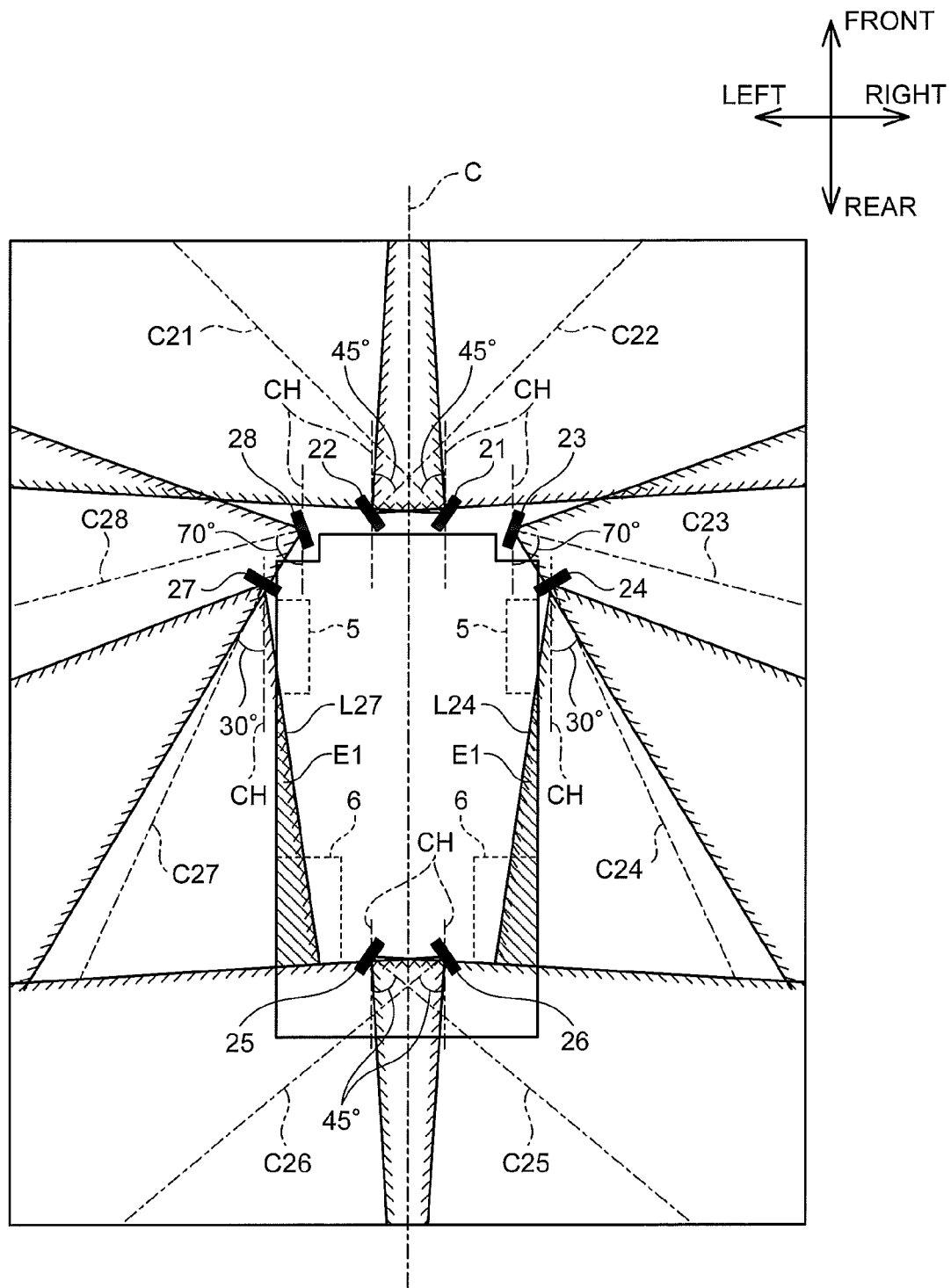
FIG. 7 is a diagram illustrating detection ranges of the respective radar devices 21 to 28.
Figure 8:
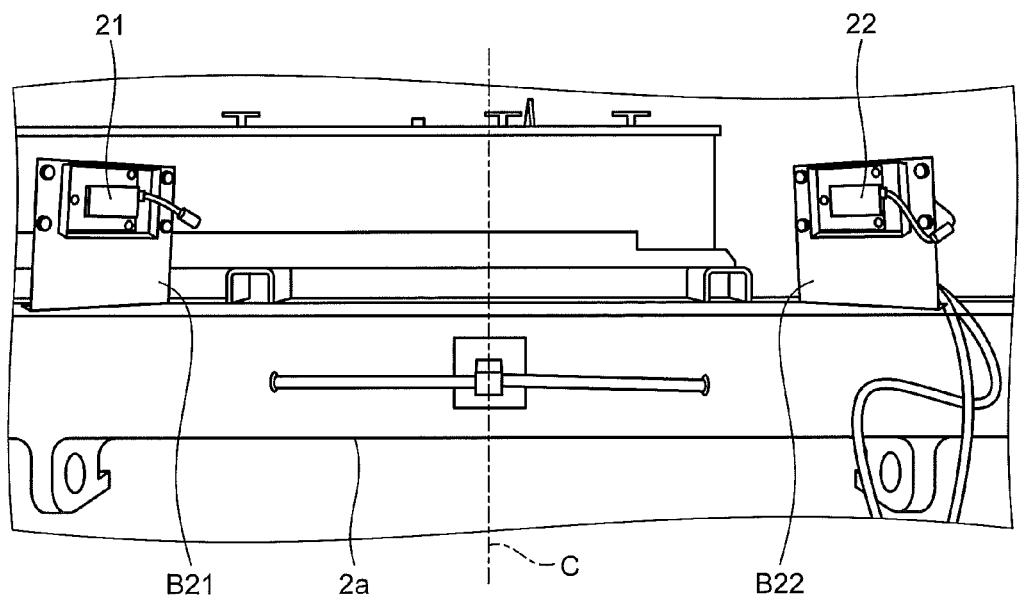
FIG. 8 is a diagram illustrating a specific arrangement of the radar device which detects a front side of the dump truck 1.
Figure 9:
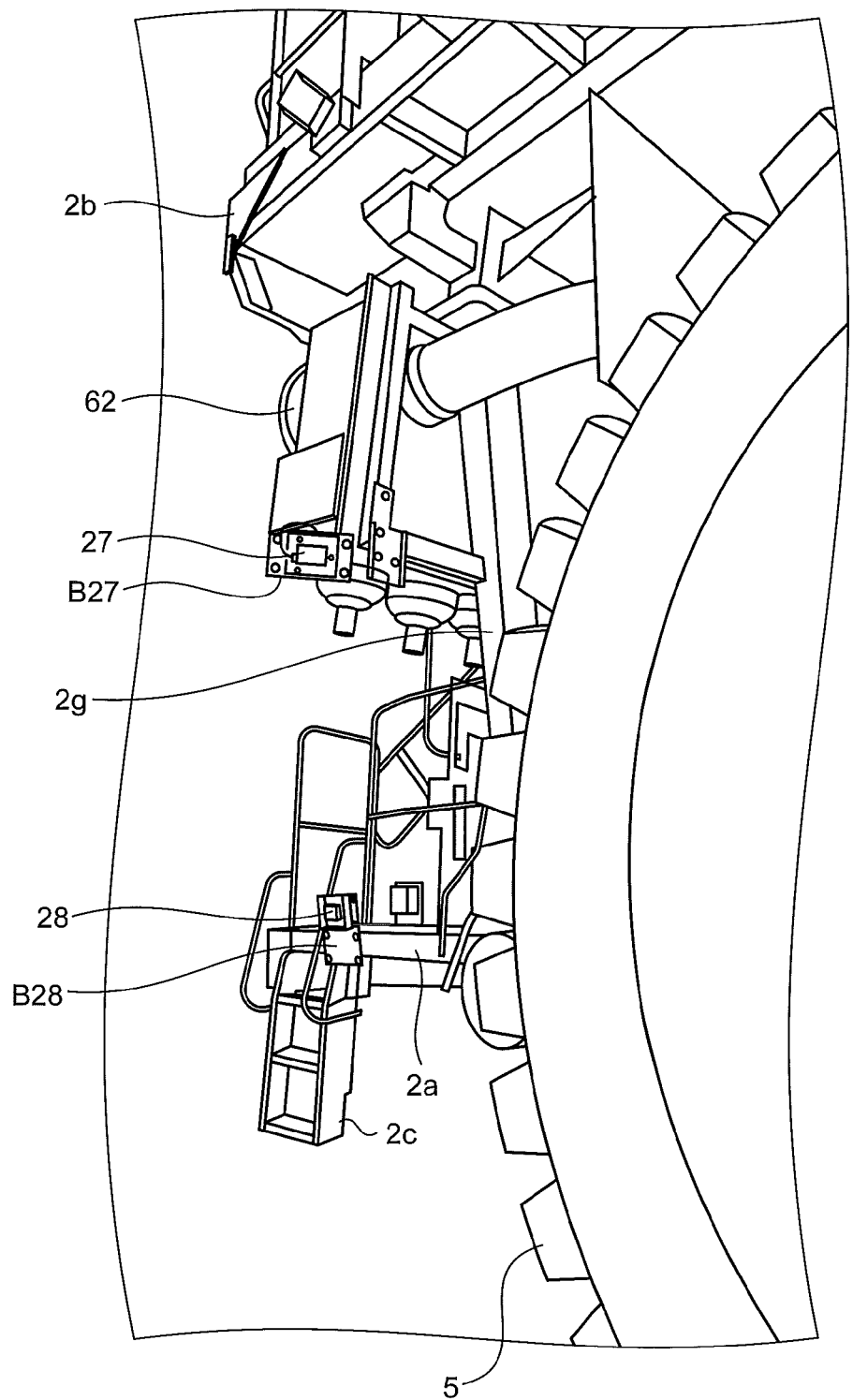
FIG. 9 is a diagram illustrating a specific arrangement of the radar device which detect the left side of the dump truck 1.
Figure 10:
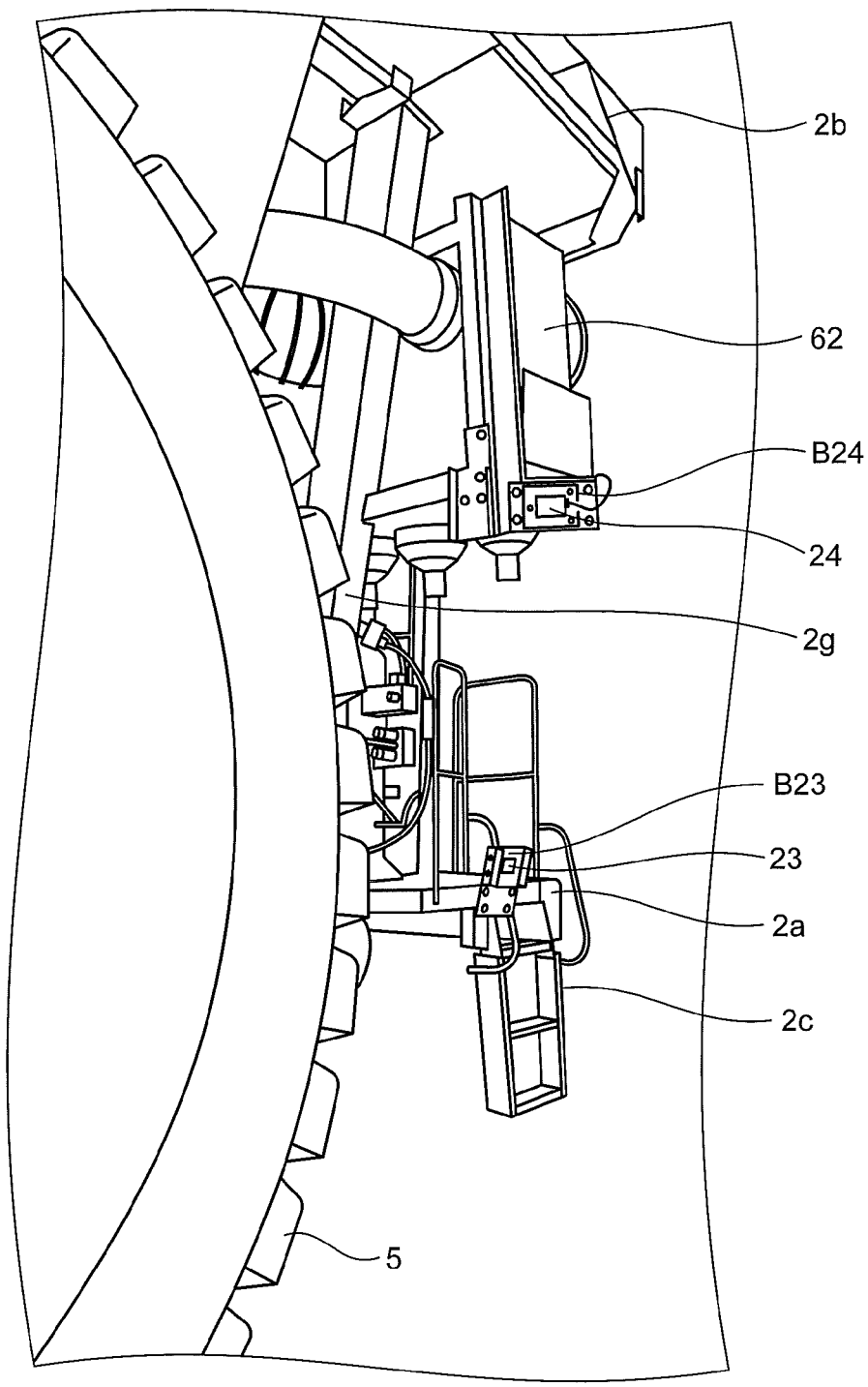
FIG. 10 is a diagram illustrating a specific arrangement of a radar device which detects the right side of the dump truck 1.
Figure 11:
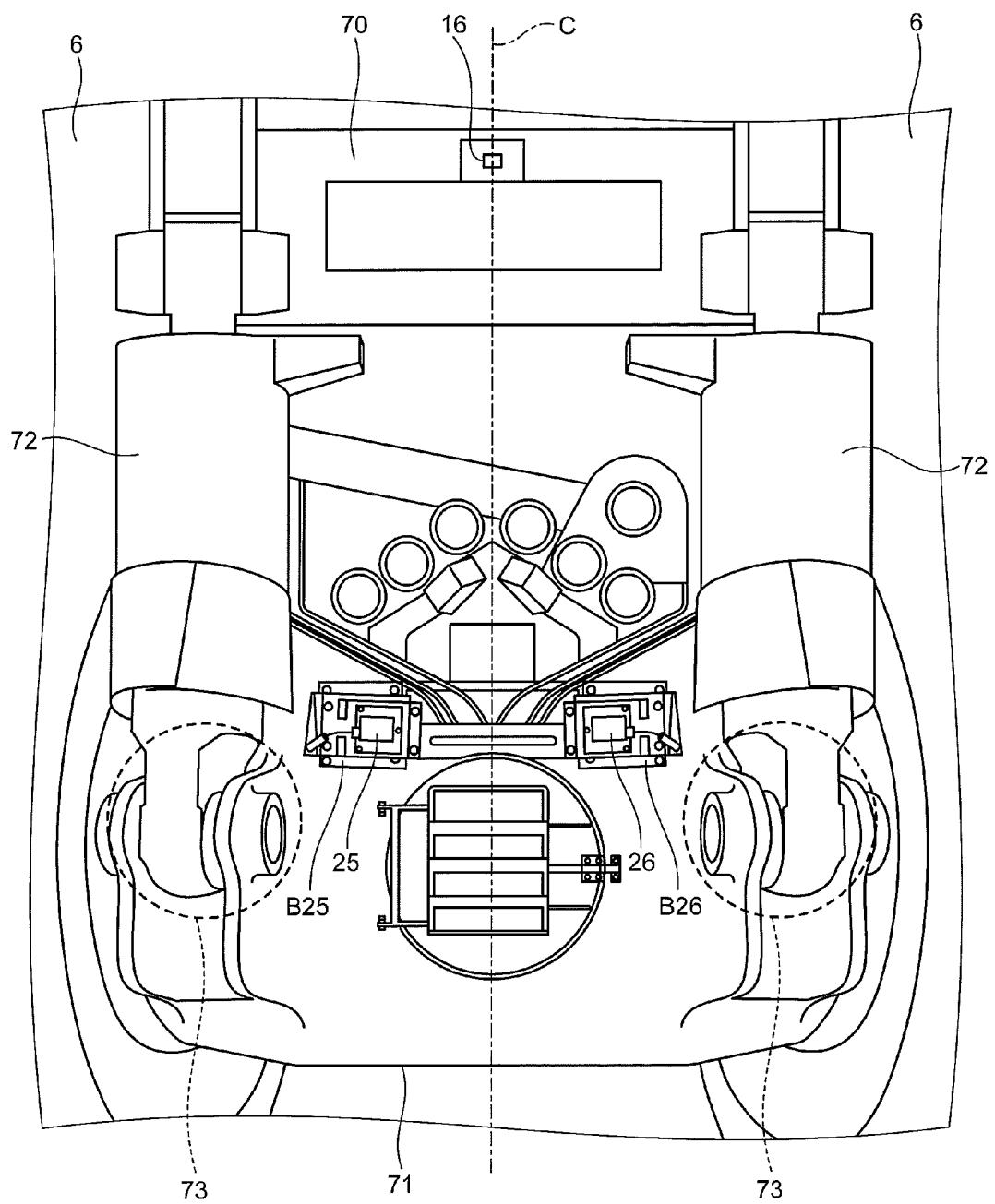
FIG. 11 is a diagram illustrating a specific arrangement of the radar device which detects the rear side of the dump truck 1.
Figure 12:
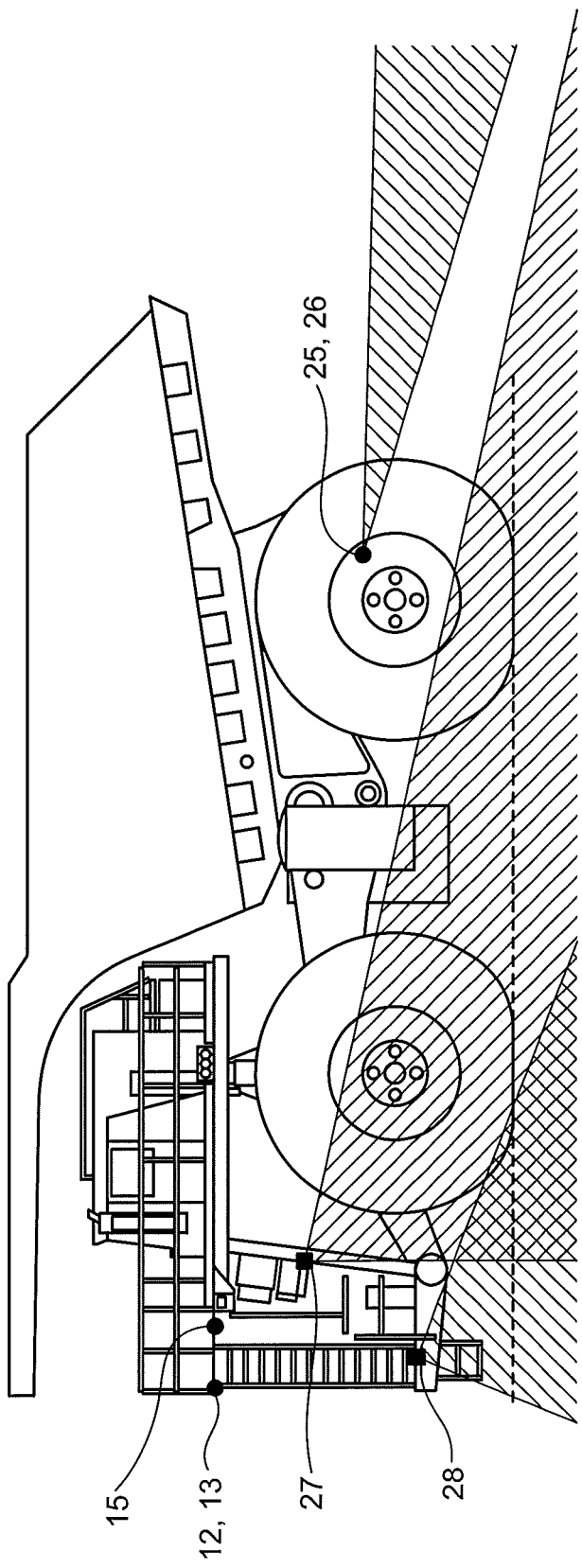
FIG. 12 is a diagram illustrating a left side surface of the dump truck 1 and an irradiation state of the radar device.
Figure 13:
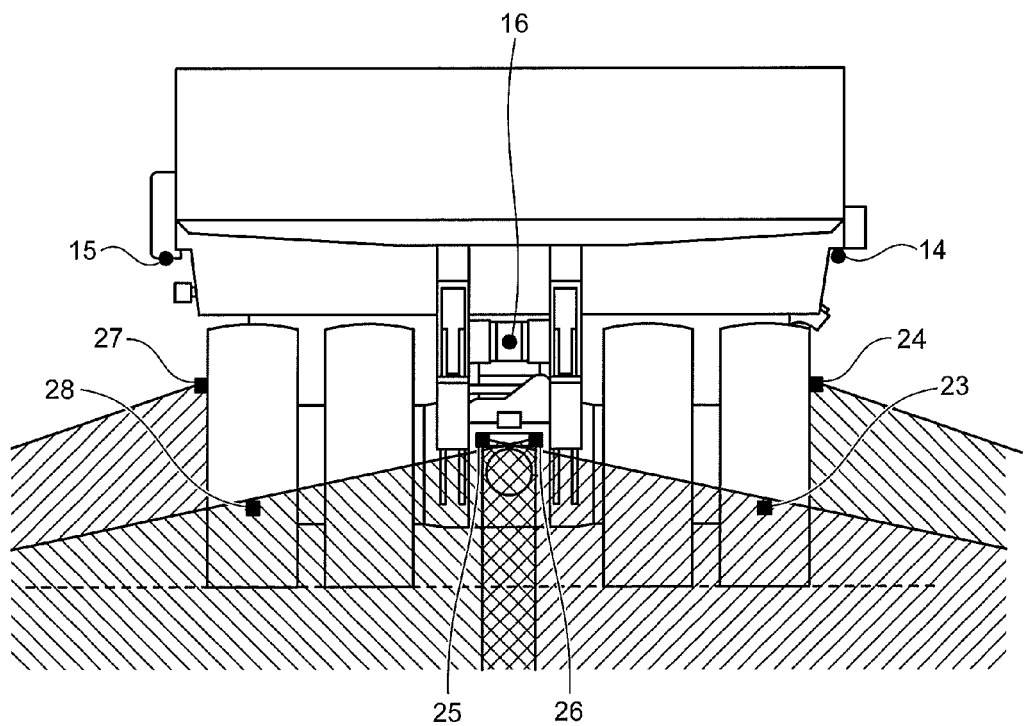
FIG. 13 is a diagram illustrating a rear side of the dump truck 1 and an irradiation state of the radar device.

FIG. 6 is a perspective view illustrating an arrangement of the radar devices 21 to 28. FIG. 7 is a diagram illustrating detection ranges of the respective radar devices 21 to 28. FIG. 8 is a diagram illustrating a specific arrangement of the radar device which detects the front side of the dump truck 1. FIG. 9 is a diagram illustrating a specific arrangement of the radar device which detects the left side of the dump truck 1. FIG. 10 is a diagram illustrating a specific arrangement of the radar device which detects the right side of the dump truck 1. FIG. 11 is a diagram illustrating a specific arrangement of the radar device which detects the rear side of the dump truck 1. FIG. 12 is a diagram illustrating a left side surface of the dump truck 1 and an irradiation state of the radar device. FIG. 13 is a diagram illustrating a rear side of the dump truck 1 and an irradiation state of the radar device.

In the embodiment, each of the radar devices 21, 22, 23, 24, 25, 26, 27, and 28 (hereinafter, referred to as appropriate radar devices 21 to 28) as the object detecting device is a ultra wide band (UWB) radar which has, for example, a detection angle of 80° (±40°) in the orientation (horizontal) direction and 16° (±8°) in the up and down (vertical) direction and a maximum detection distance of 15 m or more. The radar devices 21 to 28 detect a position (relative position) of the object existing in the periphery of the dump truck 1 relative to the dump truck 1. The respective radar devices 21 to 28 are attached to the outer peripheral portion of the dump truck 1 as in the image capturing devices 11 to 16. The detection angle of each of the radar devices 21 to 28 in the orientation (horizontal) direction is set to 80° (±40°), but the radar device may have a larger detection angle. Further, the respective radar devices 21 to 28 are indicated by the arrows in FIG. 6, but the directions indicated by the arrows indicate the directions of the detection ranges of the respective radar devices 21 to 28.

The radar devices 21 and 22 will be described by mainly referring to FIG. 6 and FIG. 8 illustrating the front side view of the dump truck 1. The radar devices 21 and 22 are provided below the ladder 2d and on the lower deck 2a which is positioned below the upper deck 2b and is positioned at the height of about 1 m from the ground. The radar devices 21 and 22 are respectively attached so as to be bilaterally symmetric to each other about the vehicle center plane C through the brackets B21 and B22. Here, as the axis inside the vehicle center plane C, a line connecting two points placed at the same height from the ground inside the dump truck 1 and extending forward from the rear side of the dump truck 1 inside the vehicle center plane C is defined as the reference axis. The one-dotted chain line CH illustrated in FIG. 7 indicates the line which is parallel to the reference axis inside the vehicle center plane C with respect to the left and right direction of the dump truck 1. Hereinafter, a specific attachment example of the radar devices 21 and 22 will be described. The radar device 21 is disposed toward the diagonally forward left side and the radar device 22 is disposed toward the diagonally forward right side. Specifically, as illustrated in FIG. 7, the irradiation center axis C21 of the radar device 21 in the horizontal direction is inclined by 45° toward the left side of the dump truck 1 in the counter-clockwise direction from the reference axis as the reference axis inside the center plane (hereinafter, referred to as an appropriate vehicle center plane) C of the dump truck 1. The irradiation center axis C22 of the radar device 22 in the horizontal direction is inclined by 45° toward the right side of the dump truck 1 in the clockwise direction from the reference axis as the reference axis inside the vehicle center plane C. The respective irradiation center axes C21 and C22 intersect each other. Further, each of the irradiation center axes of the radar devices 21 and 22 in the vertical direction has a depression angle of about 5°. With such a configuration, it is possible to detect all obstacles in a front region from the front end of the dump truck 1.

The radar device 28 and the radar device 23 which are disposed so as to be bilaterally symmetric to each other about the vehicle center plane C will be described by referring to FIG. 6, FIG. 9 illustrating the left side view of the dump truck 1, and FIG. 10 illustrating the right side view of the dump truck 1. The radar device 28 is provided at the left end of the lower deck 2*a* and near the upper end of the ladder 2*c*, which are positioned below the upper deck 2*b* provided with the image capturing devices 13 and 15 mainly capturing the left side of the radar devices 21 and 22. The radar device 28 is attached to the lower deck 2*b* through the bracket B28, and is disposed so as to face the left side and the outside of the radar devices 21 and 22.

The radar device 23 is provided at a position bilaterally symmetric to the radar device 28 about the vehicle center plane C as illustrated in FIG. 10 illustrating the right side view of the dump truck 1 or FIG. 7 to be described later in detail. The radar device 23 is provided at the position of the right end of the lower deck 2*a* and of the ladder 2*c* provided at the right side of the vehicle, which are positioned below the upper deck 2*b* provided with the image capturing devices 12 and 14 mainly capturing the right side of the dump truck 1. The radar device 23 is attached to the lower deck 2*a* through the bracket B23 so as to face the right side and the outside of the dump truck 1.

FIG. 7 illustrates detection ranges of the radar devices 21 to 28. First, a specific attachment example of the radar devices 23 and 28 disposed so as to be bilaterally symmetric to each other about the vehicle center plane C will be described. The irradiation center axis C23 of the radar device 23 in the horizontal direction is inclined by 70° toward the right side of the dump truck 1 in the counter-clockwise direction from the reference axis as the reference axis inside the vehicle center plane C. The irradiation center axis C28 of the radar device 28 in the horizontal direction is inclined by 70° toward the left side of the dump truck 1 in the clockwise direction from the reference axis as the reference axis inside the vehicle center plane C. Further, each of the irradiation center axes of the radar devices 23 and 28 in the vertical direction has a depression angle of about 5°.

The radar devices 23 and 28 detect the object which exists at the side of the dump truck 1, and particularly, at the front side of the front wheel 5 and the rear wheel 6. Further, since the radar devices 23 and 28 are positioned below the vessel 4 and the upper deck 2*b*, the radar devices are not easily influenced by the collision with rocks flying out from the vessel 4 during the loading operation.

The radar device 27 and the radar device 24 which are disposed so as to be bilaterally symmetric to each other about the vehicle center plane C will be described by referring to FIG. 6, FIG. 9 illustrating the left side view of the dump truck 1, and FIG. 10 illustrating the right side view of the dump truck 1. The radar device 27 is disposed at the side end of an air cleaner 62. The air cleaner 62 is provided at a position protruding toward the side from a front fender 2*g* which is positioned at the left side of the vehicle and extends toward the lower deck 2*a* positioned below the upper deck 2*b*. The upper deck 2*b* is provided with the image capturing devices 13 and 15 which mainly capture the right side of the dump truck 1. The radar device 27 is attached to the front fender 2*g* through the bracket B27 so as face backward. In the embodiment, the attachment height of the radar device 27 is away from the ground by about 2.5 m, but the attachment height may be appropriately defined depending on the size of the vehicle. The attachment heights of the other radar devices 21 to 26 and 28 may be appropriately defined depending on the size of the vehicle.

As illustrated in FIGS. 6 and 7, the radar device 24 is provided at a position bilaterally symmetric to the radar device 27 about the vehicle center plane C from the left side view of the dump truck 1. The radar device 24 is disposed at the side end of the air cleaner 62. The air cleaner 62 is provided at a position protruding toward the right side from the front fender 2*g* which is positioned at the right side of the vehicle and extends toward the lower deck 2*a* positioned below the upper deck 2*b*. The upper deck 2*b* is provided with the image capturing devices 12 and 14 which mainly capture the right side of the vehicle. The radar device 24 is attached to the front fender 2*g* through the bracket B24 so as to face backward.

Next, a specific attachment example of the radar devices 24 and 27 will be described. The irradiation center axis C24 of the radar device 24 in the horizontal direction is inclined by 30° toward the right side of the dump truck 1 in the counter-clockwise direction from the reference axis as the reference axis inside the vehicle center plane C. The irradiation center axis C27 of the radar device 27 in the horizontal direction is inclined by 30° toward the left side of the dump truck 1 in the clockwise direction from the reference axis as the reference axis inside the vehicle center plane C. Such an angle is not limited to 30° and may be 45° or less. That is, the angle may be set such that the rear limit lines L24 and L27 in the horizontal detection range face the vehicle center plane C and the irradiation region is provided with a vehicle overlapping region E1 including the front wheel 5 and the rear wheel 6. It is desirable to direct the irradiation center axes C24 and C27 so that the front wheel 5 is slightly included in the irradiation region and the ground contact portion of the rear wheel 6 is included in the irradiation region. Each of the irradiation center axes of the radar devices 24 and 27 in the vertical direction has a depression angle of about 15°. The vehicle overlapping region E1 is a region in which the region inside the dump truck 1 overlaps the irradiation region and is included in the vehicle region to be described later.

The radar devices 24 and 27 detect the object which exists at the side of the dump truck 1, and particularly, the side and rear regions corresponding to the entire region at the side of the vessel. Further, since the respective radar devices 24 and 27 are positioned below the vessel 4 and the upper deck 2*b*, the radar devices are not easily influenced by the collision with rocks flying out from the vessel 4 during the loading operation.

As illustrated in FIG. 7, the side detection ranges of the radar devices 23 and 24 in the horizontal direction and the side detection ranges of the radar devices 27 and 28 in the horizontal direction respectively include overlapping regions. For this reason, the radar devices 23, 24, 27, and 28 may completely detect the object which exists in both side regions from the front end of the dump truck 1 to the rear end thereof. Further, the radar devices 23 and 24 which are disposed at the right side of the vehicle at the left symmetric position of the dump truck 1 provided with the cab 3 may detect the object which exists at the right side of the dump truck 1 and is not easily seen from the cab 3.

The radar devices 25 and 26 will be described by referring to FIG. 6 and FIG. 11 illustrating the rear side view of the dump truck 1. The radar devices 25 and 26 are disposed at the height of about 2 m from the ground and are disposed at the rear side of a casing of a rear axle 71 of a driving shaft of the rear wheel 6 positioned below a cross member 70 provided with the image capturing device 16 of the vessel 4. Furthermore, the attachment heights of the radar devices 25 and 26 may be appropriately defined depending on the size of the vehicle. The radar devices 25 and 26 are respectively attached through the brackets B25 and B26 so as to be bilaterally symmetric to each other about the vehicle center plane C. Further, the radar devices 25 and 26 are provided between bonding portions 73 of rear suspension cylinders 72. The radar device 25 is disposed so as to face the diagonally backward right side and the radar device 26 is disposed so as to face the diagonally backward left side.

As illustrated in FIG. 7, the irradiation center axis C25 of the radar device 25 in the horizontal direction is inclined by 45° toward the right side of the dump truck 1 in the counter-clockwise direction from the reference axis as the reference axis inside the vehicle center plane C. The irradiation center axis C26 of the radar device 26 in the horizontal direction is inclined by 45° toward the left side of the dump truck 1 in the clockwise direction from the reference axis as the reference axis inside the vehicle center plane C. The respective irradiation center axes C25 and C26 intersect each other on the vehicle center plane C below the vessel 4. Further, each of the irradiation center axes of the radar devices 25 and 26 in the vertical direction has a depression angle of 0 to 10°, and in the embodiment, about 5° in the depression angle direction.

The respective radar devices 25 and 26 are attached so as to be bilaterally symmetric to each other about the vehicle center plane C and the respective irradiation center axes intersect each other. For this reason, it is possible to completely detect the object which exists in the rear region from the rear end of the dump truck 1. In particular, the radar devices 25 and 26 are disposed in the casing of the rear axle 71 lower than the cross member 70 so as to have a small depression angle. As illustrated in FIGS. 12 and 13, the radar devices 25 and 26 which are provided at the low position of the dump truck 1 so as to have a small depression angle may simultaneously detect the object far from the dump truck 1 and the object hidden at the lower side or the rear side of the vessel 4. In the embodiment, the irradiation center axis C25 of the radar device 25 in the horizontal direction and the irradiation center axis C26 of the radar device 26 in the horizontal direction are set to 45° with respect to the vehicle center plane C, but may be 45° or less. For example, the angle may be 30°. The value may be defined depending on the backward projection degree of the radar devices 25 and 26 with respect to the rear end of the rear wheel 6.

Eight radar devices 21 to 28 may detect the relative position between the dump truck 1 and the object in the detection range in the entire circumference of the dump truck 1 by 360°. Eight radar devices 21 to 28 respectively transmit the relative position information items representing the relative positions between the respectively detected objects and the dump truck 1 to the controller 100. In this way, the plurality of (eight) radar devices 21 to 28 are provided in the vehicle body portion 2, and may detect the object which exists in the entire circumference of the vehicle body portion 2.

The radar devices 21 to 28 which detect the objects existing in the respective directions of the dump truck 1 are attached to the members lower than the respective image capturing devices 11 to 16 capturing the respective directions of the dump truck 1 so as to generate the bird's-eye images. The respective image capturing devices 11 to 16 do not cause a sense of discomfort in the bird's-eye image when the image capturing devices are disposed at a high position so as to generate the bird's-eye image. Further, even when the radar having a narrow angle of the irradiation region in the vertical direction is used, if the radar is provided at a position lower than the image capturing devices 11 to 16, it is possible to display a mark corresponding to the object position information detected by the radar devices 21 to 28 in the bird's-eye image which is captured and generated by the image capturing devices 11 to 16 capable of detecting the object from a near position to a far position.

Controller

The controller 100 illustrated in FIG. 3 displays the existence of the object in the periphery of the dump truck 1 in the bird's-eye image 200 by using the image capturing devices 11 to 16 and the radar devices 21 to 28 and notifies the existence of the object to the operator as needed. As illustrated in FIG. 3, the controller 100 includes a bird's-eye image synthesizing unit 110, a camera image switching/viewing point changing unit 120, an object position information generating unit 130, a display control unit 140, an object information collecting unit 210, and an object processing unit 220.

The bird's-eye image synthesizing unit 110 is connected to the image capturing devices 11 to 16 as illustrated in FIG. 3. The bird's-eye image synthesizing unit 110 receives a plurality of image information items (the first image information to the sixth image information) which are respectively generated by the capturing of the respective image capturing devices 11 to 16. Then, the bird's-eye image synthesizing unit 110 synthesizes the images corresponding to the received plurality of image information items and generates the bird's-eye image 200 including the entire periphery of the dump truck 1. Specifically, the bird's-eye image synthesizing unit 110 generates the bird's-eye image information for displaying the bird's-eye image 200, obtained by projecting a plurality of images onto a predetermined projection plane, on the monitor 50 by respectively changing the coordinates of the plurality of image information items.

As illustrated in FIG. 3, the camera image switching/viewing point changing unit 120 is connected to the image capturing devices 11 to 16. Then, the camera image switching/viewing point changing unit 120 switches the bird's-eye image 200 and the images captured by the respective image capturing devices 11 to 16 and displayed on the screen of the monitor 50 in response to, for example, the obstacle detection result by the radar devices 21 to 28. Further, the camera image switching/viewing point changing unit 120 changes the image information items acquired by the respective image capturing devices 11 to 16 to the image information from the viewing point of the upward infinity.

As illustrated in FIG. 3, the object position information generating unit 130 is connected to the camera image switching/viewing point changing unit 120, the display control unit 140, and the object processing unit 220. The object position information generating unit 130 generates the object position information for synthesizing and displaying the object position information acquired by the radar devices 21 to 28 in the bird's-eye image 200 which is formed by synthesizing the image information acquired by the respective image capturing devices 11 to 16 and transmits the result to the camera image switching/viewing point changing unit 120 and the display control unit 140.

As illustrated in FIG. 3, the display control unit 140 is connected to the bird's-eye image synthesizing unit 110, the camera image switching/viewing point changing unit 120, and the object position information generating unit 130. The display control unit 140 generates the bird's-eye image 200 including the position of the object based on the bird's-eye image information in the entire periphery of the dump truck 1 generated by the bird's-eye image synthesizing unit 110 and the object position information in the entire periphery of the dump truck 1 acquired by the radar devices 21 to 28. The image is displayed on the monitor 50. In this way, the display control unit 140 may notify the existence of the object in the periphery of the dump truck 1 as an alarm to the operator of the dump truck 1 by displaying the mark representing the object existing in the periphery of the dump truck 1 on the monitor 50 based on the object position information. Furthermore, the display control unit 140 may display the mark representing the object existing in the periphery of the dump truck 1 on the monitor 50 together with the image information acquired by the image capturing devices 11 to 16. Further, a speaker 51 is connected to the display control unit 140. The display control unit 140 may notify an alarm by generating an alarm sound representing the existence of the object in the periphery of the dump truck 1 through the speaker 51 based on the object position information.

As illustrated in FIG. 3, the object information collecting unit 210 is connected to the radar devices 21 to 28 and the object processing unit 220. The object information collecting unit 210 receives the object detection result in the respective detection ranges of the radar devices 21 to 28 and transmits the object detection result to the object processing unit 220.

As illustrated in FIG. 3, the object processing unit 220 is connected to the object information collecting unit 210 and the object position information generating unit 130. The object processing unit 220 transmits the object position information received from the object information collecting unit 210 to the object position information generating unit 130.

The controller 100 is configured by the combination of, for example, a computer including a CPU (Central Processing Unit) as a calculation device and a memory as a storage device and an image processing device (for example, an image board) executing an image process such as a synthesis of the bird's-eye image. The image processing device is equipped with, for example, an exclusive IC (for example, FPGA: Field-Programmable Gate Array) executing an image process such as a synthesis of the bird's-eye image, a memory (for example, VRAM: Video Random Access Memory), and the like.

In the embodiment, as illustrated in FIG. 4, the image capturing devices 11 to 16 are disposed at the front surface and the side surface of the upper deck 2b and below the vessel 4. Then, the controller 100 generates the bird's-eye image 200 illustrated in FIG. 5 by synthesizing the first image information to the sixth image information captured and acquired by the image capturing devices 11 to 16 and displays the result on the monitor 50 which is disposed at the front side of the driver seat 31 inside the cab 3. At this time, the monitor 50 displays an image such as the bird's-eye image 200 in response to the control of the controller 100. The bird's-eye image 200 may be obtained by the controller 100 through the synthesizing of the first image information to the sixth image information corresponding to the first region 11C to the sixth region 16C captured by the image capturing devices 11 to 16. The perimeter monitoring system 10, and more specifically, the display control unit 140 of the controller 100 displays the bird's-eye image 200 on the monitor 50. Further, the display control unit 140 acquires the object position information generated by the object position information generating unit 130 and displays the mark representing the object existing in the periphery of the dump truck 1 in, for example, the bird's-eye image 200 of the monitor 50. By using the perimeter monitoring system 10, the operator of the dump truck 1 may monitor the entire range of 360° in the periphery of the dump truck 1 just by seeing the bird's-eye image 200 displayed on the monitor 50.

Subject Detecting Process Based on Information Detected by Radar Devices 21 to 28

Figure 14:
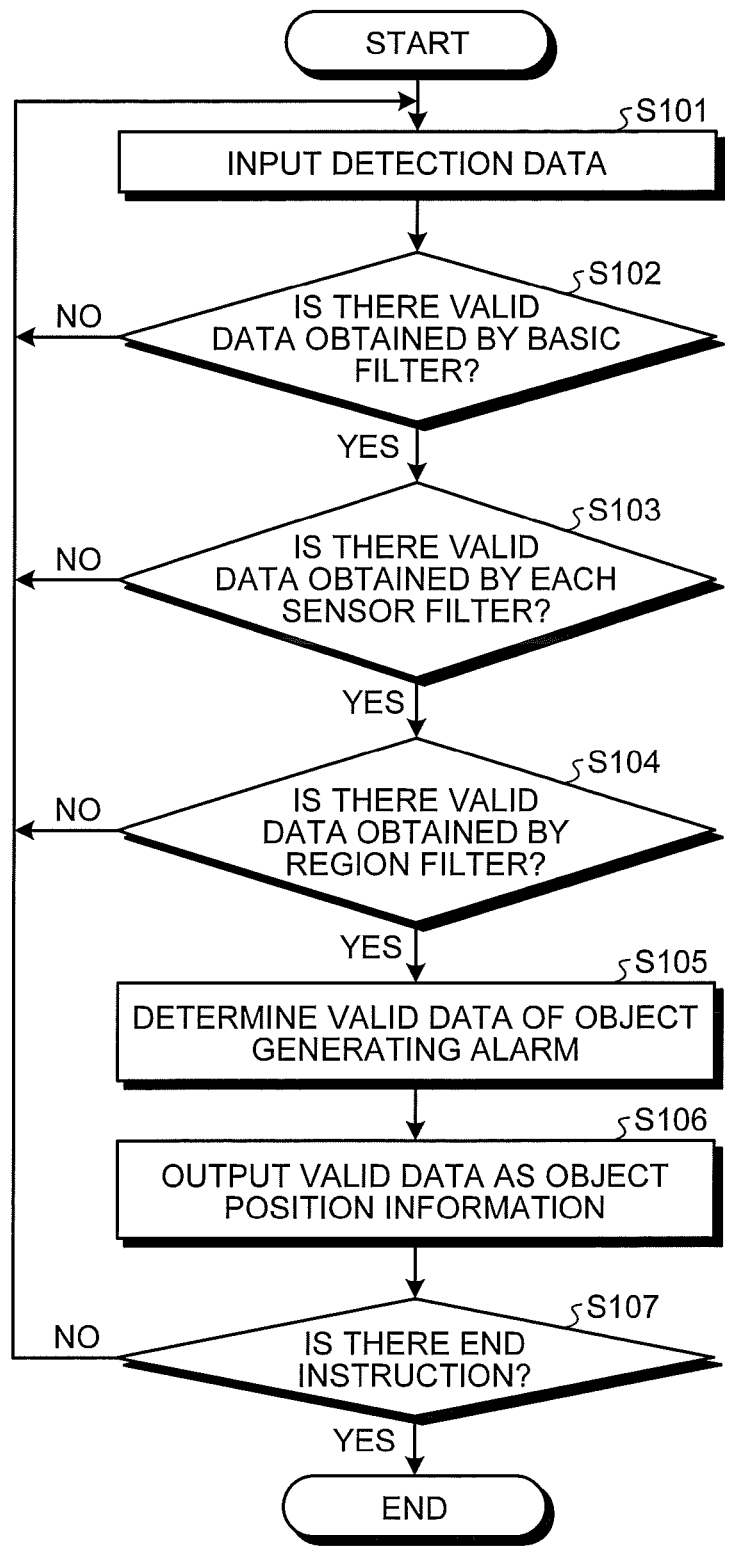
FIG. 14 is a flowchart illustrating a sequence of a subject detecting process based on the information detected by the radar device.

FIG. 14 is a flowchart illustrating a procedure of the subject detecting process based on the information detected by the radar device. In step S101, the object processing unit 220 illustrated in FIG. 3 inputs the information (hereinafter, referred to as appropriate radar detection data) obtained by the predetermined scanning of the respective radar devices 21 to 28 from the object information collecting unit 210. Next, in step S102, the object processing unit 220 determines whether the radar detection data includes valid data using a basic filter. The basic filter (pre-processing filter) has a valid detection range representing, for example, a size of an automobile inside the detection range (the valid scanning angle and the valid distance) of the radar, and extracts and outputs data having a predetermined minimum reflection signal strength as valid data (first valid data). The basic filter is included in the object processing unit 220 of the controller 100.

When the first valid data is extracted by the basic filter (Yes in step S102), the routine proceeds to step S103, and the object processing unit 220 determines whether the extracted first valid data includes valid data (second valid data) which is regarded as valid data by each sensor filter. Each sensor filter performs a filter process based on the specification of each of the radar devices 21 to 28. Each sensor filter divides the ranges detected by the radar devices 21 to 28 into a plurality of regions corresponding to the detection abilities of the radar devices 21 to 28, and extracts and outputs data satisfying the condition of each region as the second valid data. The strength of the reflection signal is small at a far region, the time resolution thereof is poor at a near region, and the detection ability may be different even by the scanning angle. Each sensor filter is included in the object processing unit 220 of the controller 100.

When there is the second valid data which is regarded as valid data by each sensor filter (Yes in step S103), the routine proceeds to step S104, and the object processing unit 220 determines whether the second valid data which is extracted by the valid determination of each sensor filter includes valid data (third valid data) which is regarded as valid data by the region filter. When the second valid data extracted by the valid determination of each sensor filter includes the vehicle region representing the dump truck 1 which is set in advance, the region filter deletes the valid data in the vehicle region. The region filter is included in the object processing unit 220 of the controller 100. The vehicle region is a region inside the dump truck 1.

When there is the valid data which is regarded as valid data by the region filter (Yes in step S104), in step S105, the object processing unit 220 determines the valid data (fourth valid data) as the alarm notifying subject from the third valid data based on a predetermined threshold value. Specifically, the object processing unit 220 determines the fourth valid data in which the value (the detection value detected by at least one of the radar devices 21 to 28) AL of the third valid data is larger than the predetermined threshold values ALcz and ALco. The detection value AL is, for example, at least one of the reflection strength of the radar, the relative speed between the detected object and the dump truck 1, and the distance between the detected object and the dump truck 1. The predetermined threshold value ALcz is a value inside the predetermined region (appropriately referred to as a limit region) set in the periphery of the dump truck 1, and the predetermined threshold value ALco is a value outside the limit region. In the embodiment, the inequality of ALcz<ALco is established.

The object processing unit 220 determines the fourth valid data which is the valid data of the object of AL≥ALcz inside the limit region and the object of AL≥ALco outside the limit region. In step S106, the object processing unit 220 outputs the determined fourth valid data as the object position information to the display control unit 140. The display control unit 140 displays the position of the object on the monitor 50 with the bird's-eye image 200 or generates an alarm sound from the speaker 51 based on the acquired object position information. That is, the controller 100 generates an alarm when at least the detection value AL is equal to or larger than the predetermined threshold values ALcz and ALco. Subsequently, in step S107, the controller 100 ends the process when there is an instruction for ending the process (Yes in step S107).

Furthermore, in the description above, the alarm is generated by using two predetermined threshold values ALcz and ALco in the entire region (the predetermined region) inside the limit region, but only one threshold value may be set as the predetermined threshold value in the specific region inside the limit region. For example, only in the rear region (the rectangular region formed at the rear side of the dump truck 1 so as to have a side of the representative dimension Wt and a side of a predetermined length backward from the representative dimension Wt) inside the limit region, only one threshold value may be set as the predetermined threshold value so that the threshold value is a small value. With such a configuration, it is possible to sensitively detect the object at the rear side of the dump truck 1 regardless of the inside or the outside of the limit region. That is, two predetermined threshold values (ALcz and ALco) are set as the same value only in the specific region inside the limit region and the different predetermined threshold values (ALcz<ALco) may be set inside and the outside the limit region as described above other than the specific region (the predetermined region). Further, the specific region in the limit region may be set as the side region inside the limit region.

In the embodiment, the rear side of the dump truck 1, that is, the specific region may not be precisely formed as a rectangular shape. For this reason, in the embodiment, the shape of the predetermined region may be formed as a rectangular shape in the plan view in at least one of the front side and the lateral side of the dump truck 1 or both sides thereof.

When there is no valid data obtained by the basic filter (No in step S102), there is no valid data regarded as valid data by each sensor filter (No in step S103), there is no valid data regarded as valid data by the region filter (No in step S104), and there is no end instruction (No in step S107), the controller 100 returns the routine to step S101 and repeats the above-described process. Next, the limit region will be described.

Figure 15:
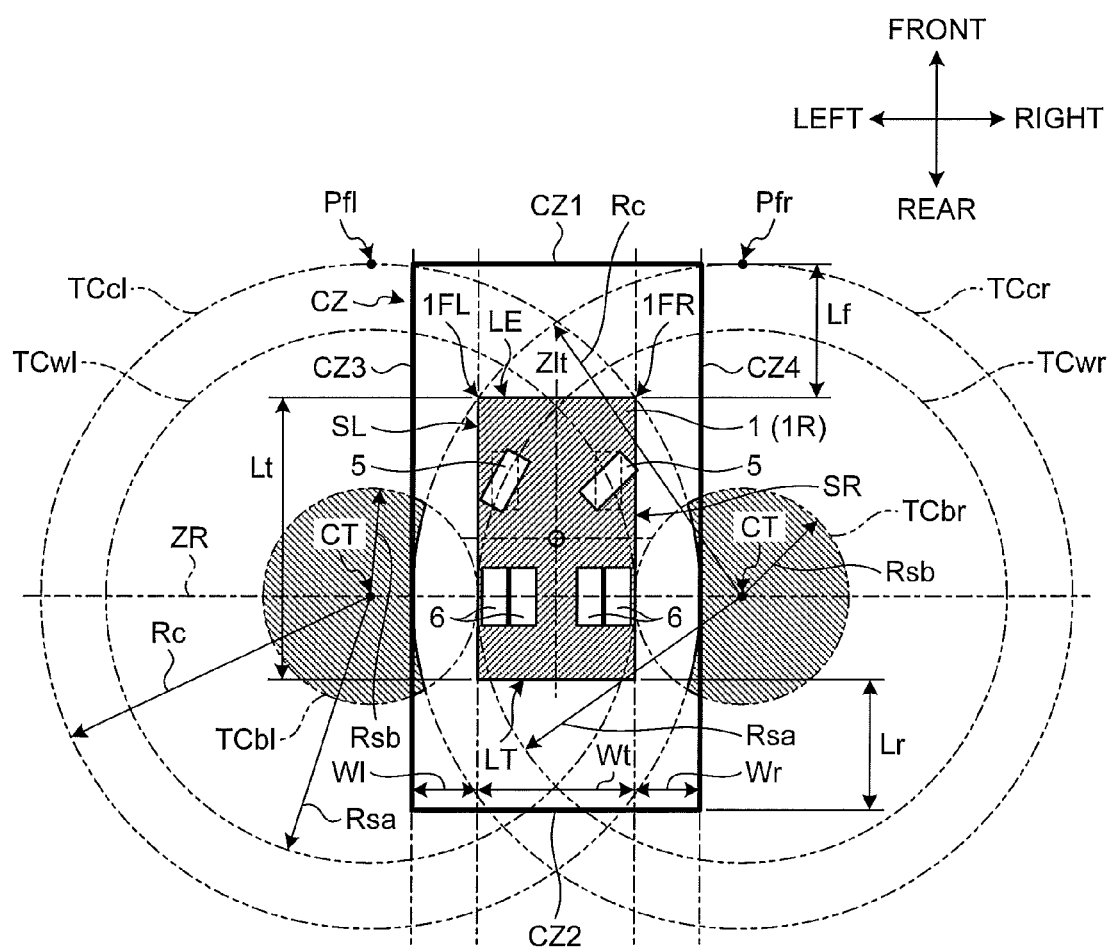
FIG. 15 is a diagram illustrating a limit region CZ.

FIG. 15 is a diagram illustrating the limit region CZ. The limit region CZ is used to set the rank of the object which needs the further attention of the operator of the dump truck 1 regarding the object existing in the periphery of the dump truck 1. That is, the limit region CZ is used to give the priority to the attention of the operator with respect to the object existing in the periphery of the dump truck 1. In the embodiment, as described above, the predetermined threshold value ALcz inside the limit region CZ is set to be smaller than the predetermined threshold value ALco outside the limit region CZ. With such a configuration, the detection value AL as the fourth valid data may be set to be different at the inside and the outside of the limit region CZ.

When the predetermined threshold value ALcz inside the limit region CZ is set to be larger than the predetermined threshold value ALco outside the limit region CZ, the priority of the alarm notified by the controller 100 becomes higher in the object existing inside the limit region CZ than the object existing outside the limit region CZ. Since the inside of the limit region CZ is a region near the dump truck 1, the controller 100 may reliably notify the object existing in such a region to the operator.

Next, a method of setting the limit region CZ will be described. In the embodiment, the limit region CZ is a predetermined region existing in the periphery of a vehicle region 1R as the region occupied by the dump truck 1. Since the dump truck 1 has a three-dimensional shape, the vehicle region 1R and the limit region CZ also have a three-dimensional shape. The vehicle region 1R is formed so that the space occupied by the dump truck 1 becomes a simple shape similar to, for example, a rectangular parallelepiped shape. In the embodiment, the vehicle region 1R is a rectangular parallelepiped region in which a bottom surface is set as a rectangular region having a short side set as the representative dimension Wt in the vehicle width direction of the dump truck 1 and a long side set as the representative dimension Lt in the front and rear direction and a height is set as the representative dimension Ht in the height direction of the dump truck 1. Accordingly, the vehicle region 1R is a rectangular region in which a short side is set as the representative dimension Wt in the vehicle width direction of the dump truck 1 and a long side is set as the representative dimension Lt in the front and rear direction when the dump truck 1 and the peripheral region are seen from the overhead position. The representative dimensions Wt, Lt, and Ht may be set as, for example, the maximum width, the maximum length, and the maximum height of the dump truck 1, but the invention is not limited thereto.

Since the limit region CZ is a predetermined region in the periphery of the vehicle region 1R, the limit region becomes the rectangular region existing in the periphery of the rectangular vehicle region 1R when the dump truck 1 and the peripheral region are seen from the overhead position. Specifically, the limit region CZ is a region which is surrounded by four lines CZ1, CZ2, CZ3, and CZ4 at the outside of the vehicle region 1R when the dump truck 1 and the peripheral region are seen from the overhead position. The line CZ1 is a line which exists at a position distant from the front edge LE of the vehicle region 1R by the distance Lf in the forward direction and is parallel to the rotation central axis of the rear wheel 6 of the dump truck 1, that is, the driving axis ZR. The line CZ2 is a line which exists at a position distant from the rear edge LT of the vehicle region 1R by the distance Lr in the backward direction and is parallel to the driving axis ZR of the dump truck 1. The line CZ3 is a line which exists at a position distant from the left edge SL of the vehicle region 1R by the distance Wl in the leftward direction and is parallel to the center axis Zlt of the dump truck 1 in the vehicle width direction. The line CZ4 is a line which exists at a position distant from the right edge SR of the vehicle region 1R by the distance Wr in the rightward direction and is parallel to the center axis Zlt of the dump truck 1 in the vehicle width direction. Since the limit region CZ is a region having a three-dimensional shape, the limit region has a height. In the embodiment, the height of the limit region CZ may be set to, for example, the representative dimension Ht of the dump truck 1 in the height direction, but the invention is not limited thereto.

The distance Lf is defined based on the traces TCcl and TCcr of front corner portions 1FL and 1FR of the dump truck 1. Specifically, the distance Lf is the shortest distance between the front edge LE of the vehicle region 1R and the portion Pfr (or Pfl) existing at the foremost side of the dump truck 1 of the trace TCcr of the front corner portion (the left front corner portion) 1FL when the dump truck 1 turns right at the minimum turning radius. Furthermore, the distance Lf may be defined by using the portion Pfl existing at the foremost side of the dump truck 1 in the trace TCcl of the front corner portion (the right front corner portion) 1FR when the dump truck 1 turns left at the minimum rotation radius. The distance Lf is obtained by the operation range based on the operation range which is supposed as the movement of the dump truck 1. In the embodiment, the distance Lr is equal to the distance Lf.

The right turning trace TCwr indicates the trace which is drawn by the left front wheel 5 when the dump truck 1 turns right at the minimum rotation radius. Further, the left turning trace TCwl indicates the trace which is drawn by the right front wheel 5 when the dump truck 1 turns left at the minimum rotation radius. The distance Wl indicates the shortest distance between the trace TCcr and the left edge SL of the vehicle region 1R at the position of the driving axis ZR of the dump truck 1. The distance Wr indicates the shortest distance between the trace TCcl and the right edge SR of the vehicle region 1R at the position of the driving axis ZR of the dump truck 1. Specifically, the distance Wl is obtained by deducting the distance from the turning center CT to the left edge SL of the vehicle region 1R, that is, the distance Rsa at the position of the driving axis ZR of the dump truck 1 from the radius Rc of the trace TCcr. Further, the distance Wr is obtained by deducting the distance from the turning center CT to the right edge SR of the vehicle region 1R, that is, the distance Rsa at the position of the driving axis ZR of the dump truck 1 from the radius Rc of the trace TCcl. The distances Wl and Wr are obtained by the operation range based on the operation range which is supposed as the movement of the dump truck 1. In the embodiment, Wl and Wr equal to each other.

The outside of the trace TCcl and TCcr is a region which does not interfere with the dump truck 1 when the dump truck 1 turns at the minimum turning radius. Further, a region which is obtained by excluding the region surrounded by the trace TCcl from the region surrounded by the circle TCbr having a radius of the shortest distance Rsb from the turning center CT at the right side of the vehicle region 1R to the right edge SR of the vehicle region 1R is a region (a portion indicated by the hatching of FIG. 15) which does not interfere with the dump truck 1 when the dump truck 1 turns at the minimum turning radius. Similarly, a region which is obtained by excluding the region surrounded by the trace TCcr from the region surrounded by the circle TCbl having a radius of the shortest distance from the turning center CT at the left side of the vehicle region 1R to the left edge SL of the vehicle region 1R is a region (a portion indicated by the hatching of FIG. 15) which does not interfere with the dump truck 1 when the dump truck 1 turns at the minimum turning radius.

In this way, the limit region CZ is set based on the traces TCcr and TCcl of the front corner portions 1FL and 1FR of the dump truck 1 when at least the dump truck 1 turns at the minimum turning radius. That is, the limit region CZ is set in the periphery of the dump truck 1 based on the operation range of the dump truck 1. Accordingly, the region outside the limit region CZ becomes a region which does not reliably interfere with the dump truck 1 when the dump truck 1 starts to turn at the minimum rotation radius when moving forward or backward. For this reason, when the controller 100 sets the priority of the alarm of the object existing inside the limit region CZ to be higher than that of the object existing outside the limit region CZ, the priority generating the alarm decreases with respect to the object existing outside the limit region CZ as the region which does not reliably interfere with the dump truck 1. Accordingly, since the controller 100 may gain the attention of the operator with respect to the object existing inside the limit region CZ closer to the dump truck 1, it is possible to reliably notify the existence of the object inside the limit region CZ to the operator. As a result, even when the dump truck 1 moves forward or backward while turning a direction, the controller 100 may reliably notify the object existing in the periphery of the dump truck 1 to the operator before starting the dump truck 1 so as to prevent the contact between the object and the dump truck 1. In this way, the perimeter monitoring system 10 which includes the controller 100 may easily notify the object which needs the attention of the operator in the object existing in the periphery of the dump truck 1 to the operator of the dump truck 1.

Further, the object processing unit 220 deletes the valid data inside the vehicle region 1R by the region filter. For example, the information of the vehicle overlapping region E1 illustrated in FIG. 7 in the information detected by the radar devices 24 and 27 is determined as the invalid data and is deleted by the region filter. As a result, since the information of the vehicle overlapping region E1 is not transmitted to the monitor 50 through the object position information generating unit 130 and the display control unit 140, the information of the vehicle overlapping region E1 is not displayed on the monitor 50.

The respective radar devices 25 and 26 are provided with an angle which is formed by the respective irradiation center axes C25 and C26 intersecting each other about the vehicle center plane C, but the rear suspension cylinder 72 is detected depending on the angle (see FIG. 11). When the rear suspension cylinder 72 is set as the vehicle region 1R in advance, the region filter of the object processing unit 220 does not delete the information of the vehicle region 1R, and hence the information of the rear suspension cylinder 72 is not displayed on the monitor 50.

Furthermore, there is a case in which the radar detection data which is detected by the radar devices 21 to 28 includes the information of the ground surface. Therefore, it is desirable that the object processing unit 220 set the region below the vehicle installation surface as the deletion region like the vehicle region 1R in advance and the radar detection data of the ground surface at a predetermined height or less in consideration of the wheel trace be deleted by the region filter.

By using the radar devices 21 to 28, the obstacle in the entire periphery of the vehicle may be detected. In particular, the obstacle at the side region of the vessel which may not be detected in the past may be detected and the obstacle at the lower region of the vessel 4 or the obstacle at the rear region in relation to the rear end of the vessel 4 may be detected.

Furthermore, the pair of radar devices 25 and 26 is disposed so as to detect the rear obstacle, but the invention is not limited thereto. For example, when the radar device having a wide angle close to 180° in the horizontal direction is used, one radar device may be provided between the bonding portions of the rear suspension cylinders at the center of the rear axle 71. In this case, even when the radar device having a narrow angle in the vertical direction in the irradiation region is used, the obstacle at the position far from the vehicle may be detected by providing the radar at the low position of the vehicle. Further, in the embodiment, the pair of left and right radars is used, but the invention is not limited to the arrangement of the pair of left and right radar devices when the object existing in the periphery of the dump truck 1 may be detected.

While the embodiment has been described, the embodiment is not limited to the above-described content. Further, the constituents that are described above include a constituent that is easily supposed by the person skilled in the art, a constituent that has substantially the same configuration, and a constituent that is included in a so-called equivalent scope. Further, the above-described constituents may be appropriately combined with each other. Furthermore, the constituents may be omitted, replaced, or modified in various forms in the scope without departing from the spirit of the embodiment.

REFERENCE SIGNS LIST

1 Dump Truck
1R Vehicle Region
1FL Front Corner Portion
2 Vehicle Body Portion
3 Cab
4 Vessel
5 Front Wheel
6 Rear Wheel
10 Working Vehicle Perimeter Monitoring System (Perimeter Monitoring System)
11, 12, 13, 14, 15, 16 Image Capturing Device
21, 22, 23, 24, 25, 26, 27, 28 Radar Device
31 Driver Seat
50 Monitor
51 Speaker
70 Cross Member
71 Rear Axle
100 Controller
110 Bird's-Eye Image Synthesizing Unit
120 Camera Image Switching/Viewing Point Changing Unit
130 Object Position Information Generating Unit
140 Display Control Unit
200 Bird's-Eye Image
210 Object Information Collecting Unit
220 Object Processing Unit

The invention claimed is:

1. A working vehicle perimeter monitoring system comprising:
  a plurality of object detecting devices which are attached to a working vehicle and detect an object existing in a periphery of the working vehicle; and
  a controller which enables or disables a generation of an alarm notifying an existence of the object based on a detection value of at least one of the object detecting devices and a predetermined threshold value and sets the predetermined threshold value to be different inside and outside a predetermined region set in the periphery of the working vehicle based on an operation range of the working vehicle,
  wherein the predetermined region is set based on at least a trace of a front corner portion of the working vehicle when the working vehicle turns at a minimum turning radius.

2. The working vehicle perimeter monitoring system according to claim 1,
  wherein the controller generates the alarm at least when the detection value is equal to or larger than the predetermined threshold value, and the predetermined threshold value inside the predetermined region is smaller than the predetermined threshold value outside the predetermined region.

3. The working vehicle perimeter monitoring system according to claim 1,
  wherein the predetermined region has a rectangular shape in a plan view.

4. The working vehicle perimeter monitoring system according to claim 3,
  wherein the predetermined region has a rectangular shape in the plan view on at least one of a front side and a lateral side of the working vehicle or on both sides thereof.

5. A working vehicle comprising:
  the working vehicle perimeter monitoring system according to claim 1.

6. A working vehicle perimeter monitoring system comprising:
  a plurality of object detecting devices which are attached to a working vehicle and detect an object existing in a periphery of the working vehicle by a radar; and
  a controller which generates an alarm at least when a detection value of at least one of the object detecting devices is equal to or larger than a predetermined threshold value,
  wherein a predetermined region is set in a periphery of the working vehicle based on at least a minimum turning radius of the working vehicle and a trace of a front corner portion of the working vehicle, and the predetermined threshold value inside the predetermined region is smaller than the predetermined threshold value outside the predetermined region.

* * * * *